United States Patent [19]

Albats et al.

[11] Patent Number: 4,760,252

[45] Date of Patent: Jul. 26, 1988

[54] WELL LOGGING TOOL WITH AN ACCELERATOR NEUTRON SOURCE

[75] Inventors: Paul Albats, Kingwood, Tex.; Stephen Antkiw, Ridgefield, Conn.

[73] Assignee: Schlumberger Technology Corporation, New York, N.Y.

[21] Appl. No.: 866,569

[22] Filed: May 29, 1986

Related U.S. Application Data

[63] Continuation-in-part of Ser. No. 508,622, Jun. 28, 1983, abandoned, which is a continuation-in-part of Ser. No. 508,623, Jun. 28, 1983, abandoned, which is a continuation-in-part of Ser. No. 508,627, Jun. 28, 1983, abandoned.

[51] Int. Cl.$^4$ ............................................. G01V 5/10
[52] U.S. Cl. ................................. 250/269; 250/266; 250/267; 250/363 R; 250/390; 250/518.1
[58] Field of Search ............... 250/270, 269, 268, 267, 250/266, 265, 262, 261, 392, 390 J, 390 I, 390 F, 390 R, 518.1, 363 R; 376/160, 161, 162, 163, 164, 165, 166

[56] References Cited

U.S. PATENT DOCUMENTS

| | | | |
|---|---|---|---|
| Re. 28,450 | 6/1975 | Schwartz | 250/264 |
| Re. 28,477 | 7/1975 | Nelligan | 250/262 |
| 2,761,071 | 8/1956 | Hurst | 250/392 |
| 2,994,776 | 8/1961 | Mott | 376/118 |
| 3,013,156 | 12/1961 | Hearn | 250/265 |
| 3,127,512 | 3/1964 | Monaghan | 376/153 |
| 3,382,363 | 5/1968 | Gant, Jr. et al. | 250/363 R |
| 3,453,433 | 7/1969 | Alger et al. | 250/265 |
| 3,483,376 | 12/1969 | Locke | 250/392 |
| 3,566,117 | 2/1971 | Tixier | 250/264 |
| 3,621,255 | 11/1971 | Schwartz | 250/265 |
| 3,688,114 | 8/1972 | Youmans | 376/153 |
| 3,775,216 | 11/1973 | Frentrop | 156/293 |
| 3,796,877 | 3/1974 | Smith, Jr. | 250/270 |
| 3,833,809 | 9/1974 | Beil | 250/270 |
| 4,074,136 | 2/1978 | Heinzelmann et al. | 250/392 |
| 4,092,536 | 5/1978 | Smith | 250/265 |
| 4,097,737 | 6/1978 | Mills, Jr. | 250/269 |
| 4,122,339 | 10/1978 | Smith, Jr. et al. | 250/264 |
| 4,122,340 | 10/1978 | Smith, Jr. et al. | 250/264 |
| 4,134,011 | 1/1979 | Smith, Jr. et al. | 250/264 |
| 4,134,937 | 1/1979 | Cass et al. | 523/136 |
| 4,137,450 | 1/1979 | Hopkinson | 250/264 |
| 4,152,590 | 5/1979 | Smith, Jr. et al. | 250/264 |
| 4,180,731 | 12/1979 | Givens | 250/270 |

(List continued on next page.)

OTHER PUBLICATIONS

Allen et al., "Some Features of Dual-Spaced Neutron Porosity Logging", *SPWLA Thirteenth Annual Logging Symposium, G* (May 7-10, 1972), pp. 1-11.

Smith et al., "Computer Simulation of Two Nuclear Well Logging Methods", *SPE* 7432, 53rd Annual Fall Technical Conference and Exhibition of the SPE of AIME (Oct. 1-3, 1978), pp. 1-8.

*Primary Examiner*—Janice A. Howell
*Assistant Examiner*—Constantine Hannaher
*Attorney, Agent, or Firm*—Brumbaugh, Graves, Donohue & Raymond

[57] ABSTRACT

In the illustrative embodiments of the invention disclosed, a neutron porosity well logging tool includes a D-T neutron accelerator, a fast-neutron monitor for monitoring accelerator output, near and far epithermal neutron detectors for deriving a primary porosity measurement, a neutron detector array intermediate to the near and far epithermal detectors for providing enhanced spatial resolution, and a far-spaced thermal neutron detector. The epithermal neutron detectors are shielded and spaced relative to the accelerator to optimize tool response to formation porosity, whereby the tool affords accurate porosity sensitivity over the entire range of porosities of interest. The source monitor may additionally be employed to measure capture gamma ray intensity vs. time between neutron bursts for deriving formation sigma. Also, the detector array may include both epithermal and thermal neutron detectors to afford an epithermal/thermal comparison measurement. The specially shielded near-epithermal is also independently useful as a monitor of the output of high energy neutron sources.

94 Claims, 8 Drawing Sheets

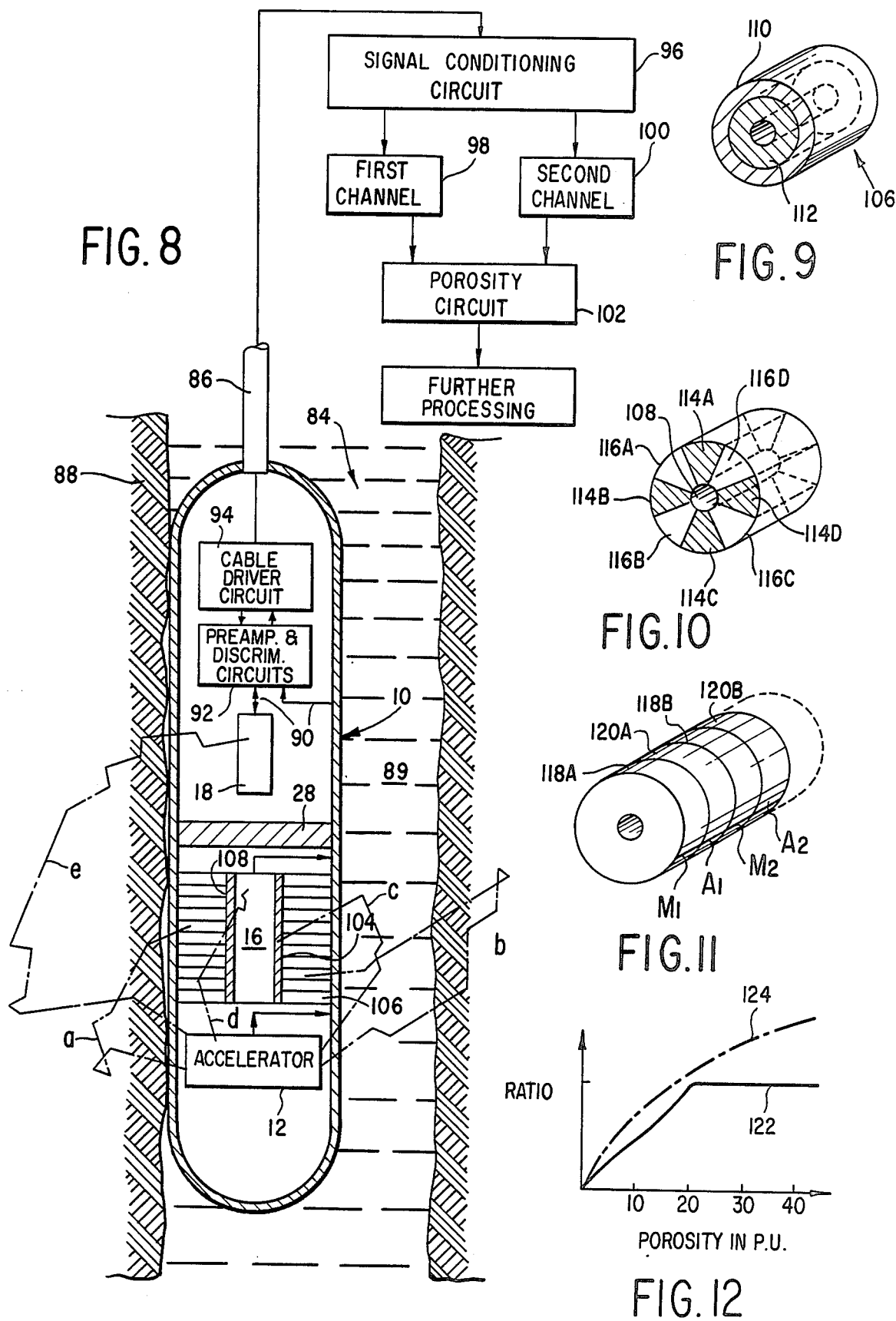

WELL LOGGING TOOL WITH AN ACCELERATOR NEUTRON SOURCE

CROSS REFERENCE TO RELATED APPLICATIONS

The present application is a continuation-in-part of U.S. patent application Ser. Nos. 508,622, 508,623, and 508,627, all filed on June 28, 1983, and all now abandoned.

FIELD OF THE INVENTION

The invention relates to a well logging tool for investigating an earth formation surrounding a borehole and determining the characteristics of the earth formation. More particularly, the invention permits a more accurate determination of formation porosity and other characteristics, such as the macroscopic capture cross section, by using an accelerator neutron source. It also relates to improved apparatus for monitoring the output of an accelerator neutron source.

DESCRIPTION OF THE PRIOR ART

Knowledge of the porosity of an earth formation surrounding a borehole is important in the petroleum industry to identify possible oil and gas producing regions and to calculate the maximum producible oil index of a formation, as well as other important parameters. Generally, known well logging tools for measuring porosity use a chemical neutron source, e.g., $Cf^{252}$, AmBe, or PuBe, and two or more neutron detectors spaced at different distances from the source. Tools of this type are described in detail in U.S. Pat. No. 3,483,376 issued to S. Locke on Dec. 9, 1969, and U.S. Pat. No. 3,566,117 issued to M. Tixier on Feb. 23, 1971.

Chemical neutron sources, however, are subject to problems of handling, shipment and storage which seriously hinder their use. Indeed, because of the concern about radiation safety, regulations applying to chemical sources are becoming more restrictive and may, in the future, prohibit their use altogether. Furthermore, chemical sources have limitations with respect to output intensity, typically being on the order of $4 \times 10^7$ neutrons per second or less. The use of larger chemical sources, even if possible within the constraints of well tool design, would merely exacerbate the aforementioned radiation safety problems.

Various types of accelerator neutron sources are also available for possible use in well logging tools, e.g. an accelerator based on the deuterium-tritium (D-T) reaction that produces 14-MeV neutrons, an accelerator based on the deuterium-deuterium (D-D) reaction that produces 2.5-MeV neutrons, and an accelerator based on the tritium-tritium (T-T) reaction that produces a spectrum of 1- to 10-MeV neutrons, with the average energy of the neutrons near 5 MeV. An example of a D-T accelerator neutron source is shown in U.S. Pat. No. 3,775,216, issued to A. Frentrop on Nov. 27, 1973, and assigned to the assignee of this application.

As an accelerator neutron source may be switched on and off as desired, the radiation problems arising from the use of a chemical source do not exist with accelerator sources. A further advantage of accelerator sources is the increased neutron source strength possible. Thus neutron outputs of $5 \times 10^8$ neutrons per second or greater are readily available, which is an order of magnitude greater than of chemical sources. Because of the greater neutron output intensity, accelerator sources also afford increased statistical accuracy and permit logging operations to be performed more rapidly. Additionally, the higher source strength increases design flexibility regarding shielding and spacing between different detectors and spacing between a particular detector and the source, so that the performance of the sonde may be improved. For example, larger detector spacings lead to smaller borehole effects.

It has been found, however, that the direct substitution of an accelerator source for a chemical source in a known porosity sonde does not provide a viable well logging tool. This results because the response of known porosity tools is governed mainly by the high energy neutron transport to the vicinity of the detector(s) and by the slowing down through energy degrading collisions to lower energies locally where detection takes place. Source neutron energy affects porosity response through the total cross sections seen by the neutrons in their transport to the detector vicinity. For a D-T source, which produces 14 MeV neutrons, the formation cross sections seen by the neutrons are quite different than those for the typical chemical source, e.g. 4-MeV average neutrons for AmBe source neutrons. Consequently, the effects of a variation in porosity on the neutron detectors, and therefore the output signals of the detectors, are different for the D-T accelerator source than for a chemical source. For instance, one substantial disadvantage of a direct substitution of a D-T accelerator source for a chemical source is a lack of porosity sensitivity above approximately 25% porosity.

Theoretically, logging devices using a single detector with a D,T accelerator would afford good sensitivity to change in porosity over the full range of porosities of interest. However, careful control or measurement of the accelerator neutron output is essential in order to derive an accurate determination of porosity where only a single detector is used. Prior attempts at developing single-detector porosity tools have suffered from inaccuracies because the accelerator neutron output has not been successfully controlled. Further, it has heretofore been difficult in practice to make direct measurements of 14 Mev neutrons which are sufficiently unaffected by the contents of the borehole environment, or with sufficient precision and reproducibility, to be useful for porosity-determination purposes.

Accordingly, a need exists for a porosity tool that uses an accelerator neutron source, thereby eliminating the radiation problems associated with the use of a chemical neutron source, and that, at the same time, affords accurate porosity sensitivity over the full range of interest in well logging applications. Also, a need exists for a porosity logging tool that uses a high-strength accelerator neutron source which provides better statistical accuracy, permits faster logging, increases design flexibility, and makes a better porosity determination that is less affected by borehole effects.

A need correspondingly exists for a monitor capable of measurements of the neutron output of a high energy neutron accelerator, but which is substantially insensitive to the borehole environment.

Knowledge of the intensity of a neutron source used in a well logging tool is important for a number of additional reasons as well. With chemical sources, which are inherently stable, the intensity of the source is known and output calibration may be readily accomplished prior to a logging operation. Obviously, however, calibration of the logging measurements relative to source strength is also required. In the case of accelerator-type sources, which are inherently unstable, accurate knowledge of source intensity is even more important. In order to obtain useful logging measurements with an accelerator source, it is essential that source intensity be accurately monitored concurrently with the logging measurements, or steps must otherwise be taken, such as using plural detectors and forming ratio measurements, to compensate for variations in source strength. Ideally the source monitor should be responsive only to source strength and should be insensitive to other variables, e.g. formation matrix and fluid, borehole fluid, borehole size, tool offset, etc., which influence borehole measurements.

Various devices for monitoring the output of neutron generators have been suggested. Typically, such devices include means for distinguishing source neutrons, i.e., neutrons emitted directly by the source that have not interacted with any nuclei, from other radiation, e.g., lower-energy, scattered neutrons and naturally occuring and induced gamma rays. An example of such a neutron source intensity monitor is disclosed in U.S. Pat. No. 4,268,749 to Mills. In that monitor, a fast neutron detector, preferably of the helium-3 type with high helium-3 gas pressure, is used to detect neutrons, and signals from the detector are transmitted to a discriminator that is biased to count helium-3 recoils from source neutrons and discriminate against nonsource neutrons from the formation.

Another example of a neutron source intensity monitor is disclosed in Jacobs U.S. Pat. No. 4,271,361 to Jacobs. In the '361 monitor, an arsenic layer is employed to emit gamma rays of approximately 17 milliseconds half life when excited by incident fast neutrons. A gamma ray detector adjacent to the arsenic layer detects the gamma rays and applies signals representative thereof to an energy-selective counting circuit, which counts the arsenic-originating gamma ray events as an indication of source intensity.

Still another example of a neutron source intensity monitor is a device having a scintillator, a photomultiplier, and a pulse shape discriminator for distinguishing source neutrons from other radiation.

Several problems exist with the known devices for monitoring neutron source output, especially in a borehole environment. Firstly, the prior devices tend not to be borehole compatible, i.e., they are affected by scattered-back neutrons, naturally occurring radiation, and other borehole effects resulting from the borehole contents, size, formation matrix, and the like. Secondly, the high temperatures and other harsh conditions typically encountered in a borehole often necessitate complex gain compensation circuitry or other measures, such as cryogenic flasks, to stabilize the monitor. Thirdly, pulse shape discriminators, in addition to having very complex electronics, work well only with liquid scintillators, which makes high-temperature operations difficult, and are comparatively slow, which prevents their use in applications where counting rates are high.

SUMMARY OF THE INVENTION

The foregoing and other requirements of the prior art are met, in accordance with one aspect of the invention, by the provision of a well logging tool that includes an accelerator neutron source, a neutron source monitor, a near epithermal neutron detector, a far epithermal neutron detector, a special neutron shield for the near epithermal detector, and, optionally, an array of neutron detectors located intermediately of the near and far epithermal detectors and/or a far thermal neutron detector.

The neutron source monitor is located so that it is responsive primarily to unmoderated neutrons that are emitted from the source, i.e., neutrons that have not interacted with the formation or the borehole. The monitor preferably comprises an organic scintillator having a characteristic dimension that is small relative to the average range of gamma ray-induced (Compton scattering) electrons that would produce light pulses of magnitudes comparable to those resulting from recoil protons produced by source neutrons, while it is large relative to the average range of such recoil protons. The scintillator is coupled via a photomultiplier to a pulse height discriminator circuit that passes pulses in the higher-energy portion of the flat portion of the scintillator pulse height spectrum where the spectrum is dominated by source neutrons. Consequently, the neutron source monitor produces a signal that is proportional to the output strength, or intensity, of the neutron source. The source monitor has good inherent gain stability, but if needed active gain compensation can be provided through, for example, the use of another pulse height differential discriminator to pass a second range of pulses and by comparing a ratio of the count rates from the two pulse ranges to a reference value.

Also, the source monitor may be used to measure the decay of the thermal neutron population in the earth formation surrounding the borehole for purposes of deriving formaton sigma. To that end, capture gamma rays detected by the monitor during periods between neutron bursts are detected and sorted in a timing multiscaler.

The near epithermal neutron detector is placed close to the neutron source. The shield for the near epithermal detector preferably raises its low energy neutron detection threshold to approximately 10 eV to 100 eV, while maintaining sensitivity to higher neutron energies, and suitably comprises an annulus of neutron moderating-neutron absorbing materials surrounding the near detector. This arrangement affords increased ratio porosity sensitivity over the entire range (0%–40%) of interest. Preferably, no high density shielding is located between the neutron source and the near epithermal neutron detector, which permits very close spacing of the near detector to the source. Such close source-detector spacing contributes to enhanced ratio porosity sensitivity.

Because of the increased average detection energy of the near epithermal neutron detector, it has a severely decreased sensitivity to the formation porosity but remains sensitive to borehole environmental effects and tool standoff. Consequently, it is useful for correcting for borehole environmental effects and tool standoff when porosity is determined by either the ratio technique or the crossplot technique, each of which is discussed in more detail below. In accordance with still a further feature of the invention, the novel shielded near-spaced neutron detector structure may be employed independently as a monitor of high energy neutron flux. In this mode of operation, it is particularly useful to monitor the source strength of D,T-type neutron accelerators.

The far epithermal detector is positioned with respect to the neutron source so that the detector remains fully sensitive to the formation porosity, and preferably is eccentered in the sonde and rear-shielded to further enhance its sensitivity to the formation and decrease its sensitivity to borehole neutrons. In another embodiment, the far epithermal detector is neither eccentered nor shielded and retains its normal porosity sensitivity.

The porosity of the formation can be determined by taking a ratio of the output signal from the near epithermal detector to the output signal from the far epithermal detector, i.e., by the ratio technique, or by using a plot of the signal from the near epithermal detector normalized by the signal from the neutron source monitor versus the signal from the far epithermal neutron detector normalized by the signal from the neutron source monitor, i.e., by the crossplot technique. With either technique, a porosity determination comparable to or better than that afforded by prior art chemical source tools is obtained, while at the same time avoiding the safety and intensity limitations associated with the prior art tools.

The intermediately-spaced neutron detector array preferably includes a pair of axially-spaced neutron detectors of like energy sensitivity (epithermal or thermal) to provide greater spatial resolution in the porosity measurement. This is particularly useful for thin bed definition. To enhance sensitivity to the formation, the detector pair is preferably eccentered in the sonde and back-shielded to reduce borehole effects. A third neutron detector in the array may have a substantially different neutron energy sensitivity, i.e., thermal if the axially-spaced pair is epithermal sensitive and epithermal if the pair is thermal sensitive, and is preferably located at the same source-detector spacing as the more closely spaced of the detector pair of the array. The third detector is preferably transversely offset from the detector pair and backshielded to reduce borehole effects. The epithermal/thermal count rate ratio of the two like-spaced detectors can be used to provide a local, derived formation sigma and for comparison of the epithermal and thermal neutron fluxes.

The optional far thermal detector is located farther from the neutron source than the far epithermal neutron detector, but close to it to enhance the statistical accuracy of the measurements. The thermal neutron detector is preferably eccentered in the sonde and shielded on the side facing the borehole so that borehole environmental effects are reduced. The provision of a thermal neutron detector in the tool permits determination of formation characteristics dependent upon thermal absorption, such as the formation capture cross section $\Sigma$, but also has good porosity sensitivity and statistical precision.

Preferably, the accelerator neutron source is a D-T source, although other types of accelerators may be used if desired. Suitable neutron detectors are helium-three (He-3) proportional counters, with the two detectors closest to the neutron source, i.e., the near epithermal neutron detector and the far epithermal neutron detector, being covered by a thin cadmium layer in order to render the detectors insensitive to neutrons with energies below approximately 0.5 eV.

BRIEF DESCRIPTION OF THE DRAWINGS

The objects and advantages of the present invention may be better understood by reference to the following detailed description of exemplary embodiments thereof, taken in conjunction with the accompanying drawings, in which:

FIG. 8 is a schematic cross-sectional view of another embodiment of a well logging tool for determining the porosity of a subterranean formation in accordance with a further aspect of the present invention, showing one embodiment of a novel shielded detector system and source monitor of the invention;

FIG. 9 is a pictorial view of another embodiment of the detector shielding structure of the present invention;

FIG. 10 illustrates another embodiment of the detector shielding structure of the present invention;

FIG. 11 is still another embodiment of the detector shielding structure of the present invention;

FIG. 12 is a graphical representation of the comparative effectiveness of the present invention as a porosity indicator relative to the two-detector, unshielded neutron porosity technique;

DETAILED DESCRIPTION OF THE PREFERRED EMBODIMENTS

Figure 1:
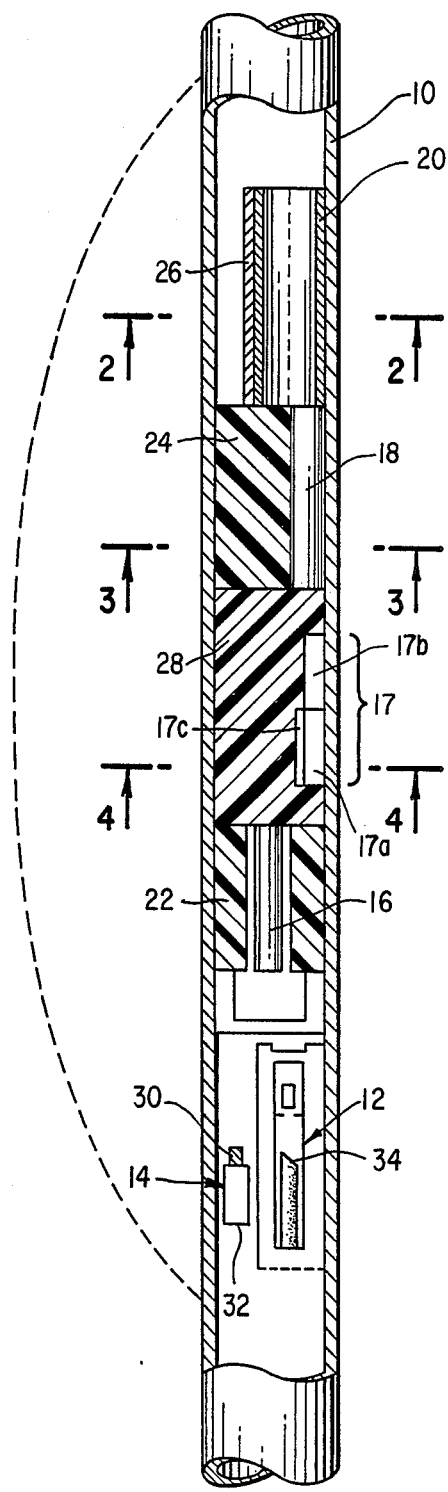
FIG. 1 is a cross-sectional view of one embodiment of a well logging tool in accordance with the invention.

Illustrative embodiments of an apparatus based on the principles of the invention are shown in the figures, in which like reference numerals designate like components. In FIG. 1, a well logging tool, or sonde, 10 for investigating the porosity, thermal neutron capture cross section and other parameters of an earth formation surrounding a borehole is shown. The sonde 10 includes an accelerator neutron source 12, a neutron source monitor 14, a near epithermal neutron detector 16, a thermal/epithermal detector array 17, a far epithermal neutron detector 18, and a thermal neutron detector 20. Shields 22, 24, and 26 are provided to shield the detectors 16, 18, and 20, respectively. A shield 28 is located between the near epithermal neutron detector 16 and the far epithermal neutron detector 18 and also serves to shield the thermal/epithermal detector array 17.

The tool 10 is intended to be a sidewall tool, and a bow spring, indicated schematically at 11, or other conventional device may be provided on the tool to urge it against the borehole wall. Although the tool is primarily intended for open hole logging, it may be used in cased holes and, if desired, may be sized for through-tubing use.

The neutron accelerator 12 may be of any suitable type, but preferably is a D-T type (14 MeV) source having an output on the order of $5 \times 10^8$ n/sec or greater for enhanced detector statistics and logging speed. Although not shown in FIG. 1, it will be understood that the accelerator package includes the necessary high-voltage power supply and firing circuits incident to accelerator operation, and these circuits may also be conventional. For purposes of the present invention, the accelerator may be operated in either the continuous (d.c.) mode or the pulsed mode. If the latter mode is used, the accelerator package would of course also include the necessary pulsing circuits, as is known. It will also be understood that suitable power supplies (not shown) are likewise provided in the tool 10 to drive the detectors 16, 17, 18 and 20 and other downhole electronics.

In a preferred embodiment, the neutron source monitor 14 includes a scintillator 30, preferably plastic, although other types may be used, which detects the fast neutrons emitted by the source, and a photomultiplier 32, which amplifies the signals produced by the scintillator 30. As described more fully hereinafter in connection with FIGS. 13-15, the monitor 14 may typically comprise a 0.5 inch (1.3 cm) diameter by 0.5 inch (1.3 cm) long plastic scintillator (NE102A, BC-438, etc.) and should be located so that its response during and immediately following a neutron burst is dominated by unmoderated, high-energy neutrons coming directly from the source and the effects of scattered neutrons and gamma rays during such time period are minimized. Preferably, the monitor 14 is located closely adjacent to, or on, the radius of the accelerator neutron source 12, with the scintillator 30 at the position of the target 34 of the accelerator 12. However, because of design constraints (space limitations), the monitor may have to be located coaxially with the source; for instance, in some cased-hole tools. In the absence of heavy shielding between the source 12 and the monitor 14, the scintillator 30 may be spaced as far as 30 cm from the source 12, as is described more fully hereinbelow.

With the neutron source monitor 14 appropriately sized and located, it is responsive during and immediately following the burst primarily to unmoderated neutrons that are incident on it directly from the neutron source, thereby reliably detecting changes in the output intensity of the source 12, and is relatively unaffected during such period by changes in borehole or formation characteristics. Consequently, the output signal of the neutron source monitor 14 is useful, as described hereinafter, in normalizing the output signals of the epithermal and thermal neutron detectors for source strength fluctuation. The monitor 14 has good inherent gain stability, but, as illustrated schematically herein in FIGS. 5 and 13, where still greater gain stability is need, it can be used in a circuit for feedback control of the photomultiplier high-voltage power supply for the monitor.

According to another feature of the invention, the monitor 14 may also be used to detect capture gamma rays as a function of time after the burst for the purpose of determining the formation sigma. The data detection and processing steps for obtaining formation sigma are described in more detail in connection with FIG. 5.

The near epithermal neutron detector 16 and the far epithermal neutron detector 18 shown in FIG. 1 are preferably helium-three (He-3) proportional counters covered by a thin, e.g., 0.02 inch (0.05 cm), cadmium shield to make the detectors insensitive to neutrons having energies below the epithermal range, i.e., below about 0.5 eV. Other types of neutron detectors, such as boron triflouride ($BF_3$) detectors, may of course be used. Detectors 16 and 18 provide the primary porosity measurement.

The sensitive, or active, volume of the near detector 16 should be located in close proximity to the source 12, preferably, although not necessarily, without intervening high density shielding. For example, for a 1 inch (2.5 cm) diameter by 3 inch (7.6 cm) long cylindrical detector, a typical detector size, a suitable spacing would be on the order of 8 to 10 inches (20 cm to 25 cm) between the center of the sensitive volume to the target of a D-T accelerator. Such close source-detector spacing enhances the ratio porosity sensitivity as compared to a longer-spaced detector with intervening shielding. As will be understood, the optimum source-detector spacing will vary with a number of factors, e.g. detector size, pressure, source intensity, accelerator type, and the like.

The shield 22 for the near detector 16 is preferably annular in shape and encircles the sensitive volume of the near detector and, as described more fully hereinbelow, is designed to raise the low energy neutron detection threshold of the near detector to a level at which the detector efficiency is nominally maximum for higher energy ranges. To that end, the detector threshold is raised to at least approximately 10 eV and preferably to on the order of 100 eV. With the shield 22 designed thusly and a near detector located in close proximity to the source without intervening high density shielding, the near detector is relatively insensitive to changes in the porosity of the formation since neutrons that have interacted with the formation will generally have energies below the low energy neutron detection threshold of the detector. However, the near detector will remain sensitive to borehole environmental and tool standoff effects since neutrons that have interacted only with the contents of the borehole will generally have energies above 10 eV. Consequently, the output signal from the near detector may be used to compensate other detector signals for borehole environmental and tool standoff effects. Apparatus and techniques useful for that purpose are described in the commonly-owned U.S. Pat. No. 4,423,323 issued Dec. 27, 1983 to Ellis et al. and U.S. Pat. No. 4,524,274 issued June 18, 1985 to Scott, the pertinent portions of which are hereby incorporated herein. Further details regarding the configuration and spacing and function of the near detector 16 and the construction of the shield 22 are described hereinbelow in connection with FIGS. 8-12.

The spacing of the far detector 18 from the source 12 is preferably selected to maximize statistical precision, i.e., counting sensitivity, while minimizing the effects of such environmental factors as tool standoff and the like. Generally, the standoff effect is reduced at greater spacings, but only at the cost of reduced counting rates. For a 1.5 inch (3.8 cm) diameter by 6 inch (15.2 cm) long cylindrical detector, another typical detector size, a suitable spacing from the accelerator target 34 to the center of the sensitive volume of the far detector 18, shielded as described hereinafter, would be on the order of 23-27 inches (58 cm-68 cm). As with the near detector, the optimum spacing will vary depending upon the size of the active volume, the pressure of the detector, etc.

Figure 3:
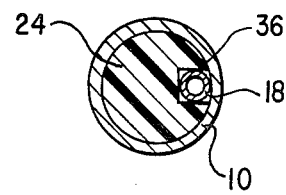
FIG. 3 is a cross-sectional view of the well logging tool embodiment shown in FIG. 1 taken along line 3—3 and illustrates the far epithermal neutron detector and the shielding therefor.

For greater formation sensitivity, the far epithermal detector 18 is preferably eccentered to one side of the sonde 10 and oriented towards the formation by shielding. As shown in FIG. 3, the shield 24 for the far epithermal detector is cylindrical in shape with a slot 36 therein, with the far detector 18 being located in the slot. The shield 24 thereby shields the sensitive volume of the far detector from neutrons incident on it from the side of the sonde towards the borehole, i.e., the side of the sonde away from the formation. As will be understood, the effect of such eccentering and rear-shielding of the far detector is to decrease the sensitivity of the far detector to borehole environmental effects and thereby increase its sensitivity to changes in the porosity of the formation.

The comparatively long spacing between the source 12 and the far detector 18 makes the far detector 18 relatively insensitive to source neutrons. However, an additional shield 28 may be provided between the near detector 16 and the far detector 18 to further reduce the sensitivity of the far detector to source neutrons.

According to another feature of the invention, the shield 28 also surrounds and shields the thermal/epithermal detector array 17 located between the near and far epithermal detectors 16 and 18. The array 17 includes a plurality, e.g. three, relatively small He-3 detectors 17a, 17b and 17c. The detectors 17a and 17b are preferably aligned axially of the tool 10 in end-to-end relation. Where space limitations do not permit such axial alignment, the detectors 17a and 17b may be cicumferentially offset, but preferably so as to be symmetrically positioned on either side of the line of contact of the tool 10 with the borehole (or casing) wall. In either case, the detectors 17a and 17b provide measurements of the neutron flux at the two detector locations. The difference between the counting rates at the two detectors (or other suitable count rate comparison) affords enhanced spatial resolution of porosity and other formation parameters. This is particularly useful for thin bed definition.

Figure 4:
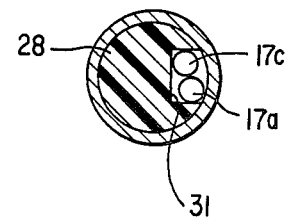
FIG. 4 is a cross-sectional view of the embodiment shown in FIG. 1 taken along the line 4—4 and illustrates the He-3 detector array and the shielding therefor.

The detectors 17a and 17b may be sensitive to either epithermal neutrons or thermal neutrons, to provide either an epithermal porosity measurement or a thermal porosity measurement. As shown in FIG. 4, they are preferably located in an axial slot 31 in the shield 28 so as to enhance sensitivity to the formation and to reduce sensitivity to the borehole.

The third detector 17c is preferably located at the same spacing from the source 12 as the detector 17a. It also is a He-3 neutron detector, but with a different energy sensitivity than the detectors 17a and 17b. Thus if the detectors 17a and 17b are epithermal detectors, the detector 17c should be a thermal detector, and vice versa. The epithermal/thermal flux ratio from the two like-spaced detectors 17a and 17c can be used to provide a local, derived formation sigma measurement and for comparison between epithermal and thermal porosity measurements. The epithermal/thermal count rate ratio can be expected to increase as formation sigma increases and to decrease as sigma decreases.

As illustrated in FIG. 4, the detector 17c is advantageously circumferentially and transversely offset from detector 17a, and may conveniently be located within the same slot 31 as the detectors 17a and 17b.

The arrangement and configuration of the He-3 detector array 17 are shown in FIGS. 1 and 4 in an idealized, i.e., illustrative, manner, and other arrangements and configurations may of course be employed. The principal purposes of the array are to provide enhanced spatial resolution in the porosity measurement, a local sigma measurement, and an epithermal/thermal flux comparison. The particular detector sizes, pressures, and source spacings employed may be selected as desired to optimize detection performance.

The sensitive volume of the optional thermal neutron detector 20 is located farther from the source than that of the far epithermal detector 18, but preferably is located as close as practical to the far detector to maximize counting rates. As with the detectors 16, 17 and 18, the location of the thermal detector can be changed depending upon such factors as the size of the active volume and the pressure of the detector. The sensitive volume may be of any appropriate size commensurate with achieving desired count rate statistics, e.g., 2.25 inch (5.7 cm) diameter by 4 inch (10.2 cm) long. Preferably, the thermal neutron detector is also eccentered in the sonde towards the formation side of the sonde.

Figure 2:
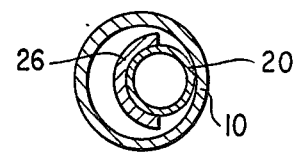
FIG. 2 is a cross-sectional view of the well logging tool embodiment shown in FIG. 1 taken along line 2—2 and illustrates the thermal neutron detector and the shielding therefor.

As depicted in FIG. 2, a shield 26 shields the sensitive volume of the thermal neutron detector 20 from neutrons incident on it from the side of the sonde towards the borehole, in the same manner that the shields 24 and 28 shield the far epithermal detector 18 and the detector array 17, respectively, as indicated above. As a result of being eccentered and because of the shielding 26, the thermal neutron detector is comparatively less sensitive to borehole environmental effects and, thereby, comparatively more sensitive to changes in formation characteristics, e.g., the formation macroscopic capture cross section $\Sigma$. The shield 26 is preferably a thin, e.g., 0.02 inch (0.05 cm), cadmium shield that has an arcuate shape with an approximately 180° arc, but other neutron absorbing materials and other shapes may be used if desired.

The shields 22, 24, and 28 may be made from any suitable material, or combination of materials, that has both neutron moderating and neutron absorbing properties. A neutron moderator is necessary in order to slow down faster neutrons, i.e., those which have undergone few, if any, formation interactions, and a neutron abosorber is necessary in order to absorb thermal neutrons, i.e., those that have been thermalized by the moderating material or by the borehole contents or formation.

The neutron absorber is preferably a 1/v type such as boron or th like, where v is neutron velocity. A suitable shielding material is boron carbide ($B_4C$) distributed in an epoxy binder or some other hydrogenous binding medium, e.g. 65% $B_4C$ by weight in epoxy. The shields 22, 24, and 28 should each be thick enough to accomplish its intended purpose with the shielding material selected. For example, if the shield 22 is made from the aforementioned 65% $B_4C$-epoxy material, a thickness of roughly 1 inch (2 cm) has been found satisfactory in order to raise the low energy neutron detection threshold of the near detector from 0.5 eV to approximately 10 eV and higher.

The function of the shielding material is discussed more fully hereinbelow with reference to the embodiment of FIGS. 8–12. The same shielding material is preferably, though not necessarily, used for all three shields 22, 24 and 28.

With the neutron source monitor 14 and the neutron detectors 16, 17, 18, and 20 appropriately spaced and shielded, improved determinations of formation porosity can be made. Since, as explained previously, the near detector 16 is relatively less sensitive to changes in porosity but relatively more sensitive to borehole environmental and tool standoff effects and the far detector 18 is relatively more sensitive to changes in porosity, an improved porosity determination can be made using either the ratio technique or, following normalization of the individual detector count rates by use of the neutron monitor intensity measurement, by a cross plot of the near detector 16 and far detector 18 count rates. As mentioned, the outputs of the array detectors 17a, 17b and 17c may be employed to obtain porosity measurements having enhanced vertical resolution, and also to provide a comparison between epithermal and thermal porosity measurements.

Furthermore, since the porosity response of the thermal neutron detector 20 is relatively less sensitive to borehole size and tool standoff effects than the porosity response of the epithermal detectors 16 and 18, its output may be used to derive an additional porosity measurement. Such a thermal neutron porosity measurement may be of particular value where the thermal detector response is free of significant influence by neutron absorbers in the formation and borehole environment. Also, the thermal detector output allows the macroscopic capture cross section $\Sigma$ and other formation capture characteristics to be determined in the same tool with the epithermal porosity measurement. Where, as described hereinafter, the neutron monitor 14 is used to detect capture gamma rays following the neutron bursts, the far-spaced thermal detector 20 may be omitted and the capture cross section and other thermal neutron-related parameters of the formation may be obtained from the monitor gamma ray data.

Figure 5:
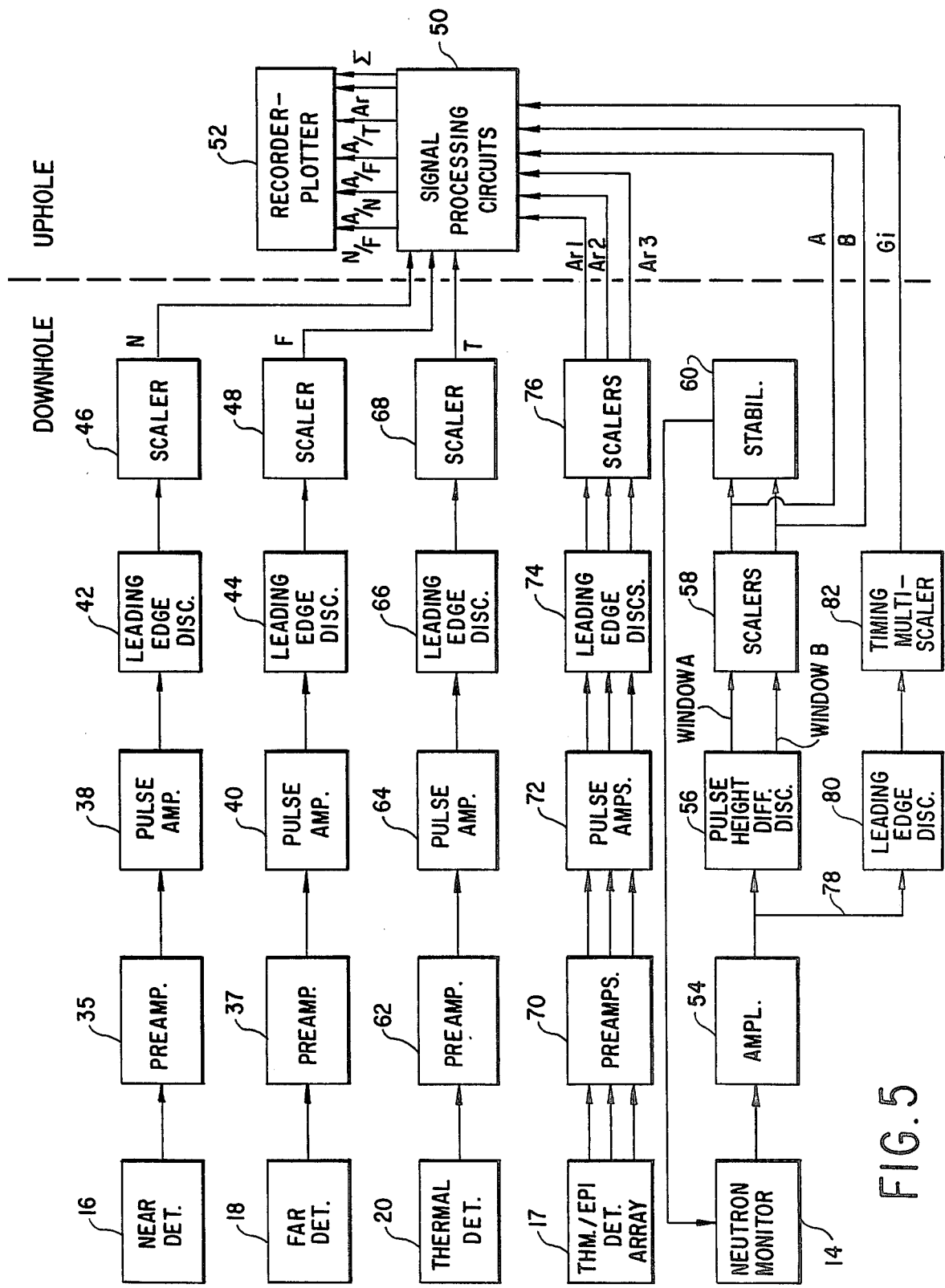
FIG. 5 is a schematic diagram of the detector signal processing circuitry of the well tool embodiment of FIG. 1.

The output signals from the He-3 epithermal detectors 16 and 18 may be amplified and counted in any suitable way to derive a count rate (N) for the near detector 16 and a count rate (F) for the far detector 18. For example, as shown in FIG. 5, the detector signals from the detectors 16 and 18 may be fed to charge sensitive preamplifiers 35 and 37 and thence to pulse amplifiers 38 and 40, with the spectrum of amplified pulses from each detector then being sent to a leading edge discriminator 42 and 44 whose output drives a scaler 46 and 48. The scaler outputs are applied to signal processing circuitry 50, which may comprise a suitably programmed digital computer, microprocessor or other data processing device, for generation of the ratio N/F of the near detector scaler counts (N) to the far detector scaler counts (F) as an indicator of porosity. This indicator has been found to be subject to relatively small environmental (mudcake, borehole size, etc.) effects and tool standoff effects, and thus to provide an accurate, reliable porosity measurement. The N/F ratio signal may be applied in conventional fashion to a recorder/plotter 52 for recording as a function of tool depth.

Figure 6:
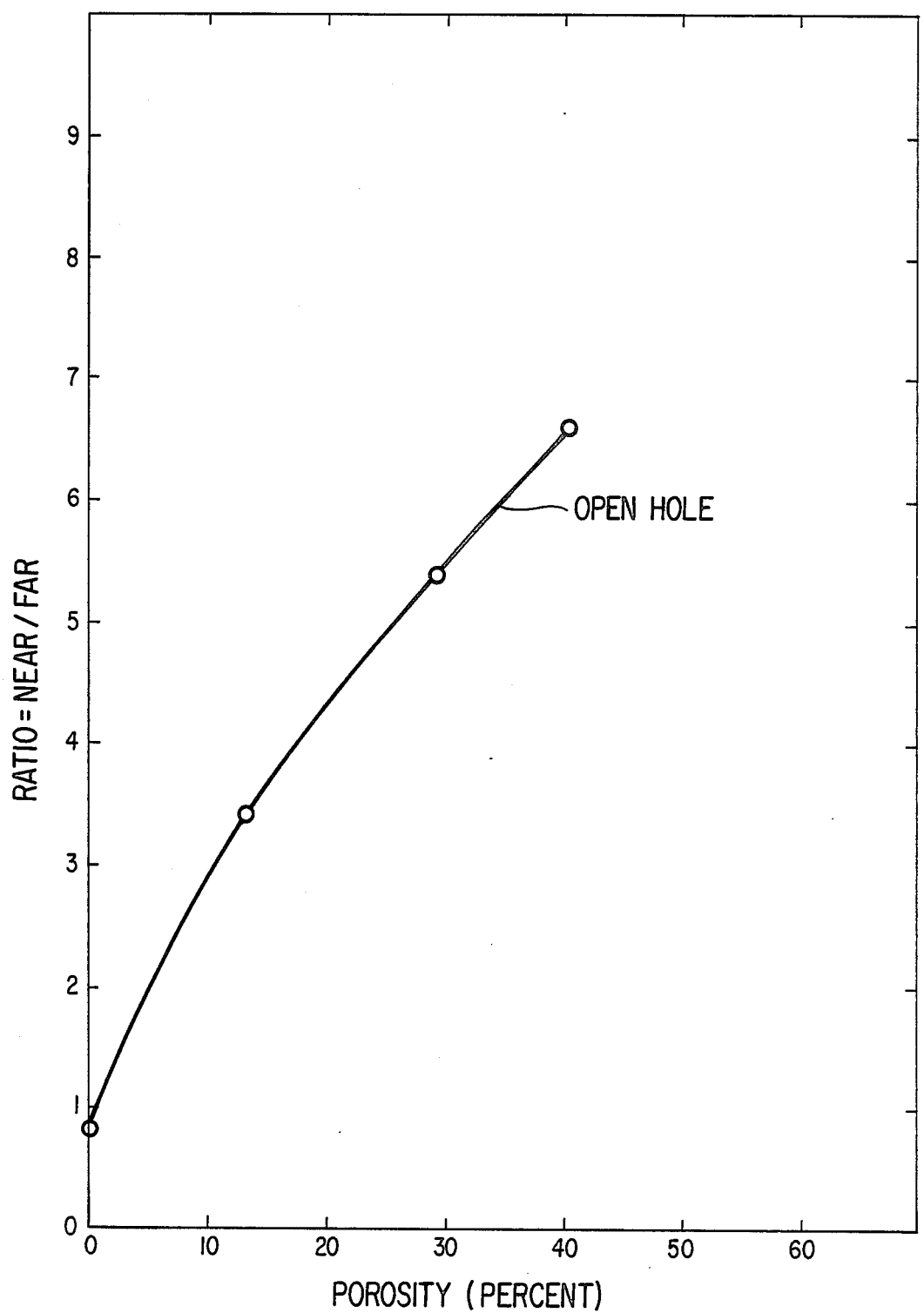
FIG. 6 is a plot of the near epithermal-far epithermal detector count rate ratio versus porosity.

FIG. 6 shows the near/far (N/F) ratio response as measured in limestone formations of porosities of 0, 13.2, ,29.3 and 40.6% with an 8-inch, uncased borehole. As will be appreciated, the porosity sensitivity of the N/F ratio is good over the entire 0 to 41% range.

If desired, a porosity determination may also be made by means of a crossplot of the near and far detector count rates. As will be understood, the crossplot technique allows for correction for environmental effects.

Figure 7:
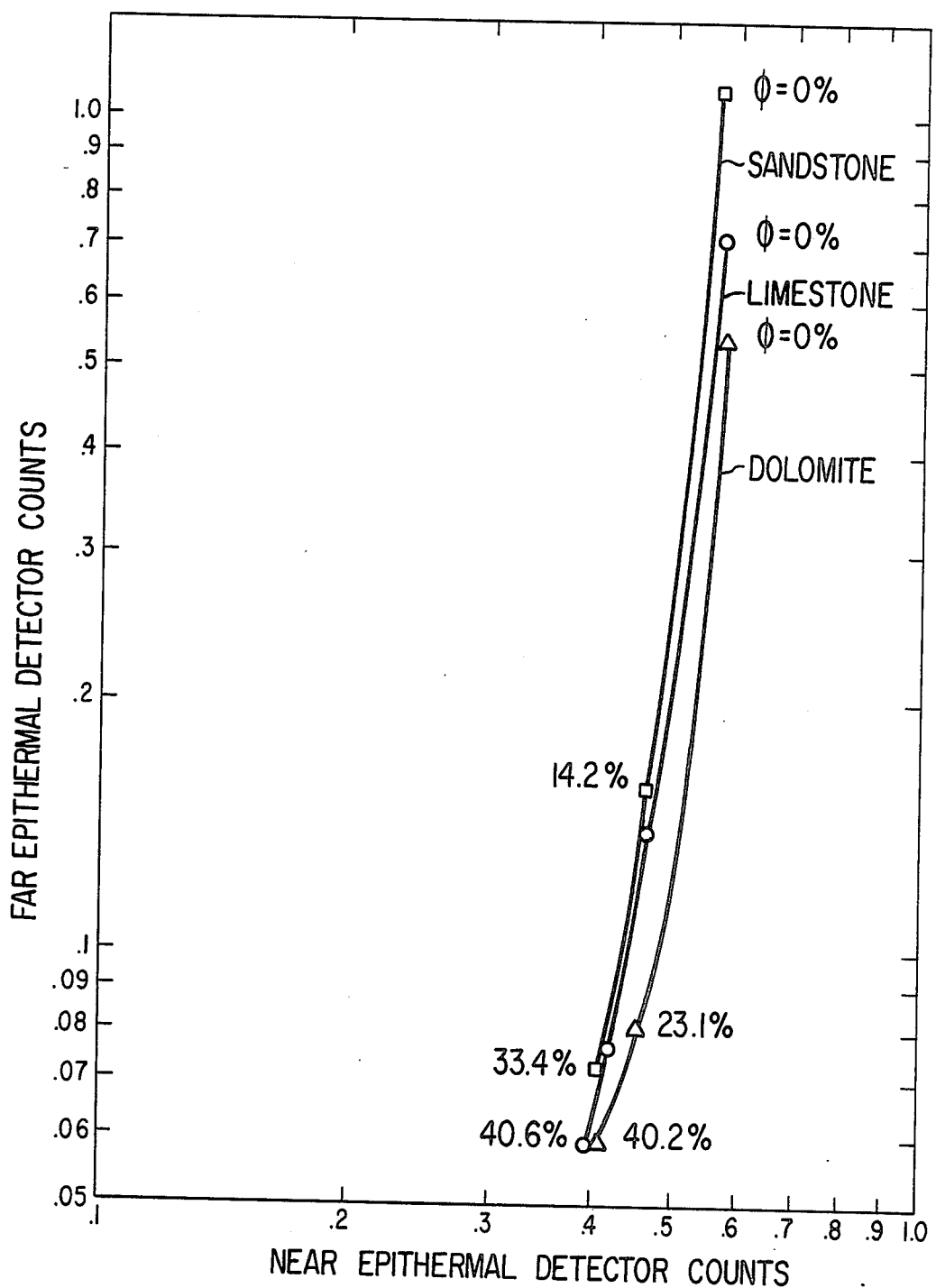
FIG. 7 is a crossplot of the far epithermal detector count rate versus the near epithermal detector count rate for various formation matrices.

FIG. 7 is a near-far (N-F) crossplot for 0 to 41% porosities in sandstone, limestone and dolomite formations, and illustrates the effect of matrix change on the crossplot. The data plotted are for an 8-inch, uncased borehole.

When the crossplot technique is used to determine porosity, the N and F count rates are first normalized by the output of the neutron flux monitor 14. For that purpose, the detector scaler 46 and 48 output signals are each divided into the count rate (intensity) output signal (Window A) from the monitor 14, as indicated in FIG. 5 by the outputs A/N and A/F from the signal processing circuitry 50. The manner in which the intensity output signal A is generated by the monitor 14 and its associated circuitry (54–60 in FIG. 5) is described hereinbelow in connection with FIGS. 13–15.

The normalized far detector count rate F is also highly porosity sensitive and may be used if desired to derive porosity information. It is, however, somewhat more susceptible to environmental effects than the N/F ratio, but this susceptibility can be decreased by use of higher strength accelerators together with greater source-to-detector spacings.

The far thermal detector output signals may likewise be similarly amplified, discriminated and scaled (components 62–68 in FIG. 5) to provide a scaler output count rate T for the thermal detector 20. This signal, too, is preferably normalized by the monitor output signal A, and may be used to derive a measurement of the formation macroscopic capture cross section $\Sigma$. It may also be used, either alone or in conjunction with one or more of the normalized epithermal detector count rate signals A/N and A/F, to derive porosity information or to evaluate the influence of neutron absorbers on the porosity measurement. Any or all of these functions may be readily implemented in the signal processing circuits 50 in any suitable manner.

The output from each of the detectors in the array 17 is also suitably amplified, discriminated and scaled (components 70–76 in FIG. 5), and the count rates therefrom Ar 1, Ar 2 and Ar 3, respectively, are transmitted to the surface signal processing circuits 50. For ease of illustration, the circuitry for the detectors 17a, 17b and 17c is shown collectively in FIG. 5, but it will be understood that each detector will have the appropriate individual components. At the surface, the count rates Ar 1, Ar 2 and Ar 3 are recorded as a function of tool depth. The difference in count rates between detectors 17a and 17b (Ar 1-Ar 2) may also be formed and recorded vs. depth to provide the aforementioned enhanced spatial information for greater vertical resolution of the porosity measurement. These count rates may first be normalized by reference to the output signal A from the monitor 14 to minimize the effect of source strength fluctuation on the individual count rates Ar 1 and Ar 2. The epithermal/thermal ratio, e.g. Ar 1/Ar 3, may also be developed and recorded vs. depth as a further porosity indicator. In addition, a local formation sigma may be derived and recorded, as indicated in FIG. 5.

Where, in accordance with the invention, the neutron monitor 14 is to be used to detect capture gamma rays following the neutron bursts, a second channel 78 (see FIG. 5) is provided in the monitor output circuitry to couple the detector output pulses via a leading edge discriminator 80 to a timing multiscaler 82. The threshold level of the discriminator 80 is set at a relatively low level, e.g., in the range of 50 KeV (equivalent gamma ray energy), to enhance count rate statistics. The multiscaler 82 sorts the pulses into time bins and transmits the count per bin data $G_i$, where i is the bin number, to the surface in digital format. Preferably a sufficient number of time bins, e.g. 256, is employed to record the entire count vs. time curve both during and after each neutron burst, but at least during substantially the full period between bursts. The count data $G_i$ are processed at the surface to derive formation sigma in any suitable manner. For example, formation sigma may be determined in accordance with the technique disclosed in U.S. Pat. No. 4,292,518 issued Sept. 29, 1981 to C. W. Johnstone. Because of the close proximity of the monitor 14 to the source 12, a diffusion correction is preferably made to the sigma value determined therefrom. The capture gamma ray data $G_i$ are preferably both deadtime and background corrected. Background measurements are preferably made during periodically repeated intervals during which the neutron bursts are suppressed, in accordance with the techniques disclosed in U.S. Pat. No. Re. 28,477 issued July 8, 1975 to W. B. Nelligan.

In the embodiment of FIG. 8, the sonde 10 is shown as suspended in a borehole 84 by a cable 86 for investigating the porosity of a subterranean formation 88. The borehole is illustrated as an open hole and as containing a well fluid 89. In the case of a completed, producing well, the sonde 10 may be sized for through-tubing use, as aforementioned. The conventional hoist and depth-recording devices (not shown) would also be employed, as will be evident to those skilled in the art. The sonde will also be understood to include a bow spring or other conventional device (see 11 in FIG. 1) for urging the sonde against the borehole wall as shown.

As in the embodiment of FIG. 1, the sonde 10 includes a neutron accelerator 12, a near-spaced neutron detector 16 and a far-spaced neutron detector 18. The accelerator and detectors may be of the types described in connection with FIG. 1. The embodiment of FIG. 8 is otherwise generally similar to that of FIG. 1, except that the detector array 17 and the thermal detector 20 have been omitted.

Electrical power for the sonde 10 is supplied over the cable 86 from a power supply (not shown) at the surface. It will be understood that suitable power supplies (not shown) are likewise provided in the sonde 10 to drive the detectors 16 and 18 and other downhole electronics.

The detectors 16 and 18 may be conventional and preferably are of the He-3 gas-filled type. A suitable gas pressure for purposes of the invention is ten atmospheres for the near detector 16 and fifteen atmospheres for the far detector 18, but these may be varied as desired to optimize the energy response of the detector. According to one feature of the invention, described more fully hereinafter, the near-detector 16 is surrounded by a novel shielding structure to modify the energy response of the near-detector system as a whole (detector 16 plus shield structure) so as to render it predominantly sensitive to neutrons having energies greater than 10-100 eV and above incident thereon directly from the accelerator 12 or its immediate vicinity.

Signals generated by the detectors 16 and 18, and representative of the number of neutrons detected, are applied in the conventional way over the conductors 90 to preamplifier and discriminator circuits 92, which, illustratively, may include multi-channel amplifiers, scaling circuits and pulse height discriminator circuits as shown in FIG. 5, preparatory to being applied to cable driver circuits 94 for transmission to the surface over the cable 86.

At the surface, the signals are received by the signal-conditioning circuits 96, where they are shaped or otherwise converted or restored for further processing as required and are applied to a multi-channel counter or rate meter, including a first channel 98 for the far detector 18 counts and a second channel 100 for the near detector 16 counts. The counts from the two detectors are accumulated for a desired time interval, e.g. one or two seconds or more, which may conveniently be related to the logging speed so as to provide an output for each incremental interval of depth along the borehole. The counter channels are then read out to a porosity circuit 102 where a suitable ratio function of the two total counts or count rates is formed as an indicator of formation porosity. For the reasons given hereinafter, this porosity determination is sensitive to formation porosity over the entire porosity range from 0 to 100 p.u. (porosity units) of interest in oil explorations, of which the range is typically from 0 to about 40 p.u. or higher.

As shown in FIG. 8, the near detector 16 is located close to the accelerator 12. For example, with a detector having an active (sensitive) volume of approximately 1 inch×3 inch (2.5 cm×7.6 cm), a centerline spacing from the target of the accelerator in the range of 6–10 inches (15–26 cm) has been found suitable. The far detector, which is larger for better statistics, e.g. 1 inch×6 inch (2.5 cm×15 cm), is suitably spaced with its center within the range of 20–26 inches (50 cm–66 cm) from the accelerator target. Both detectors may be clad in cadmium to raise the deection system detection thresholds to epithermal or higher energy levels, or only one or neither may be so clad. The cadmium cladding 104 is illustrated in FIG. 8 on the near detector only and is shown exaggerated in thickness for clarity. An approximate thickness is on the order of 0.05 cm. Where sensitivity to thermal neutrons is desired, either or both detectors may be unclad.

In accordance with the invention, the near detector 16 is additionally surrounded by an annular shield 106 composed of boron carbide ($B_4C$) in an epoxy binder or some other hydrogenous binding medium. The shield 106 is annular in cross section and is formed with a central bore 108 for receipt of the cadmium-clad detector 16. The shield 106 thus performs a dual function, acting both as a neutron moderator, by virtue of the hydrogenous binder, and as a neutron absorber, by virtue of the boron carbide. To that end, suitable proportions for the shield may be approximately 47% by volume of $B_4C$ and 53% by volume of binder.

The result of this combined shielding of the near detector is markedly to reduce the sensitivity of the near detector system to formation porosity. That is to say, the number of neutrons detected by the near detector changes much less with porosity than does the number detected by the far detector, and the effect of this alteration of the near detector porosity sensitivity is to enhance the porosity resolution of the sonde. The far detector, of course, remains fully sensitive to porosity, as before.

The reasons for the change of near detector system porosity sensitivity are thought to be two-fold. First, the combined $B_4C$-epoxy shield structure moderates the energies of those neutrons directly incident on the detector 16 from the source 12 to levels more readily detected by the He-3 detector 16, and second, it shifts the relative sensitivity of the near detector system towards higher energy neutrons and away from lower energy neutrons. What this means in practical terms is that the signal produced by detector 16 has a relatively smaller component indicative of the characteristics of the formation and a relatively larger component indicative of the initial neutron flux intensity from the source. This may be better understood by reference to the following description of a theoretical, somewhat simplified model of the principal neutron interactions which occur in the region of the sonde 10, as indicated diagrammatically by neutron paths a-e in FIG. 8.

The accelerator may be regarded for present purposes as an essentially isotropic neutron source, with neutrons emanating in all directions. The neutrons following paths a and b may be considered representative of those which travel through the sonde 10, the well fluid 89, and enter the formation 88, undergoing scattering reactions along their path lengths, and which are then scattered back to the sonde in the region of the near detector system. Such neutrons are hereinafter referred to as "far field" (formation) neutrons. Due to the energy loss resulting from the scattering reactions, the far field neutrons are statistically less likely to successfully traverse the $B_4C$-epoxy shield 106 and are more likely to be absorbed therein. Neutrons scattered back from the borehole contents are more likely to have higher energy than those illustrated by paths a and b and therefore might traverse the outer $B_4C$-epoxy shield 106. These neutrons are likely to be so moderated in energy in the process as to have a high probability of being absorbed in the cadmium cladding 104. This is illustrated by the path c in FIG. 1. These neutrons are referred to hereinafter as "near field" neutrons. It will be appreciated that neutrons impinging directly on the outer shield 106, such as those represented by path d, as well as other neutrons having undergone relatively less energy loss through either few major scatterings or many slight scatterings, are statistically most likely to pass through both shields 106 and 104 and reach the sensitive volume of the detector. At least some, however, will be sufficiently moderated in energy by the $B_4C$-epoxy shield to be within the sensitive range of the He-3 detector 16. These neutrons are referred to hereinafter as "source" neutrons.

Hence the combined effect of the shields 106 and 104 is to render the near detector 16 largely responsive to neutrons which carry little information from the formation and borehole environment. Since the scattering and absorption processes involved are statistical in nature, there will of course be some overlap between the categories of neutrons in this model that are detected, i.e., most, but not all, far field neutrons reaching the near detector will be stopped by the shielding and not counted. So the near detector will retain a slight porosity sensitivity. A larger, but still not predominant, proportion of the total neutrons counted will be near field neutrons, and the remaining predominant category of the neutrons counted will be source neutrons.

On the other hand, neutrons reaching the formation 88 along the path e and scattered back to the sonde in the region of the far detector 18 will be unimpeded by any moderating shield such as 106 and will thus reach the sensitive volume of the detector and be counted. The far detector, therefore, remains fully sensitive to formation porosity.

As mentioned, the cadmium cladding raises the detection threshold of the detectors to epithermal energy or higher, e.g. to 0.5 ev and above. The thickness of the $B_4C$-epoxy shield 106 can be selected to provide the desired threshold level for the detector. Generally, the level should be selected at or about the point where the detector is at the maximum nominal efficiency for detection of the higher energy source neutrons, i.e., at about the energy level at which the source neutrons will begin to be filtered out, e.g., at least approximately 10 eV and preferably on the order of 100 eV.

Although uniform mixing of the moderating material (epoxy resin) and the absorbing material ($B_4C$) is depicted in the embodiment of FIG. 8, it may be advantageous in certain circumstances to provide separate annuli of different materials. Thus in the embodiment of FIG. 9, the outer shield 106 is shown as composed of two annuli, the outer one 110 of a hydrogenous material such as polyethylene and the inner one 112 of $B_4C$. The shielding materials may also be arranged in other ways. For instance, in the embodiment of FIG. 10, the absorber material, e.g. $B_4C$, is shown arranged in circumferentially-spaced sectors 114A, 114B, 114C and 114D interleaved by alternate sectors 116A, 116B, 116C and 116D of moderator material, e.g., epoxy resin. This particular construction is useful in reducing the sensitivity of the detector-shield system to the spatial distribution of neutron energies. The energy response of the detector system could also be altered by removing the cadmium cladding or by using another material having a different energy absorption cross section for the cladding, such as indium, gadolinium or silver.

In a like vein, the embodiment of FIG. 11, wherein the moderating material or materials are arranged in layers 118A, 118B, etc., between alternate axially-spaced layers 120A, 120B, etc. of absorbing material or materials, is useful for applications where it is desired to take advantage of or compensate for the axial distribution of neutrons along the length of the detector. The same moderating material and absorbing material may be used throughout, or, as indicated in FIG. 11, different types of moderating materials $M_1$, $M_2$, etc., and different types of absorbing materials $A_1$, $A_2$, etc., may be employed.

FIG. 12 illustrates the comparative porosity sensitivity of the embodiment of FIG. 8 relative to the prior art 14 Mev two-detector porosity technique. The solid-line graph 122 represents the plot of the N/F ratio as a function of porosity in the prior art tool. As previously mentioned, this graph shows little, if any, porosity response above about 20 p.u. By comparison, the porosity response of the N/F ratio formed using the shielded-detector technique of the present invention, represented by the dotted-line graph 124, shows significant change with porosity over the full range up to and above 40 p.u.

Where reference is made to $B_4C$ as an element of the detector shielding, it will be understood that either $B^{10}$ or $B^{10}$ enriched natural boron may be used. $B^{10}$ has the greater absorption cross section, but a lower material concentration. Thus a possible shielding composition might be $B_4C$ enriched in $B^{10}$. Similarly, other high-cross section 1/v-like absorbers could be used, such as lithium carbonate in an epoxy resin binder. In this case, the $Li_2CO_3$ could advantageously be enriched in $Li^6$. Similarly, binder materials other than epoxy resin or hydrogenous materials other than polyethylene may be used as moderators in accordance with the invention.

Figure 13:
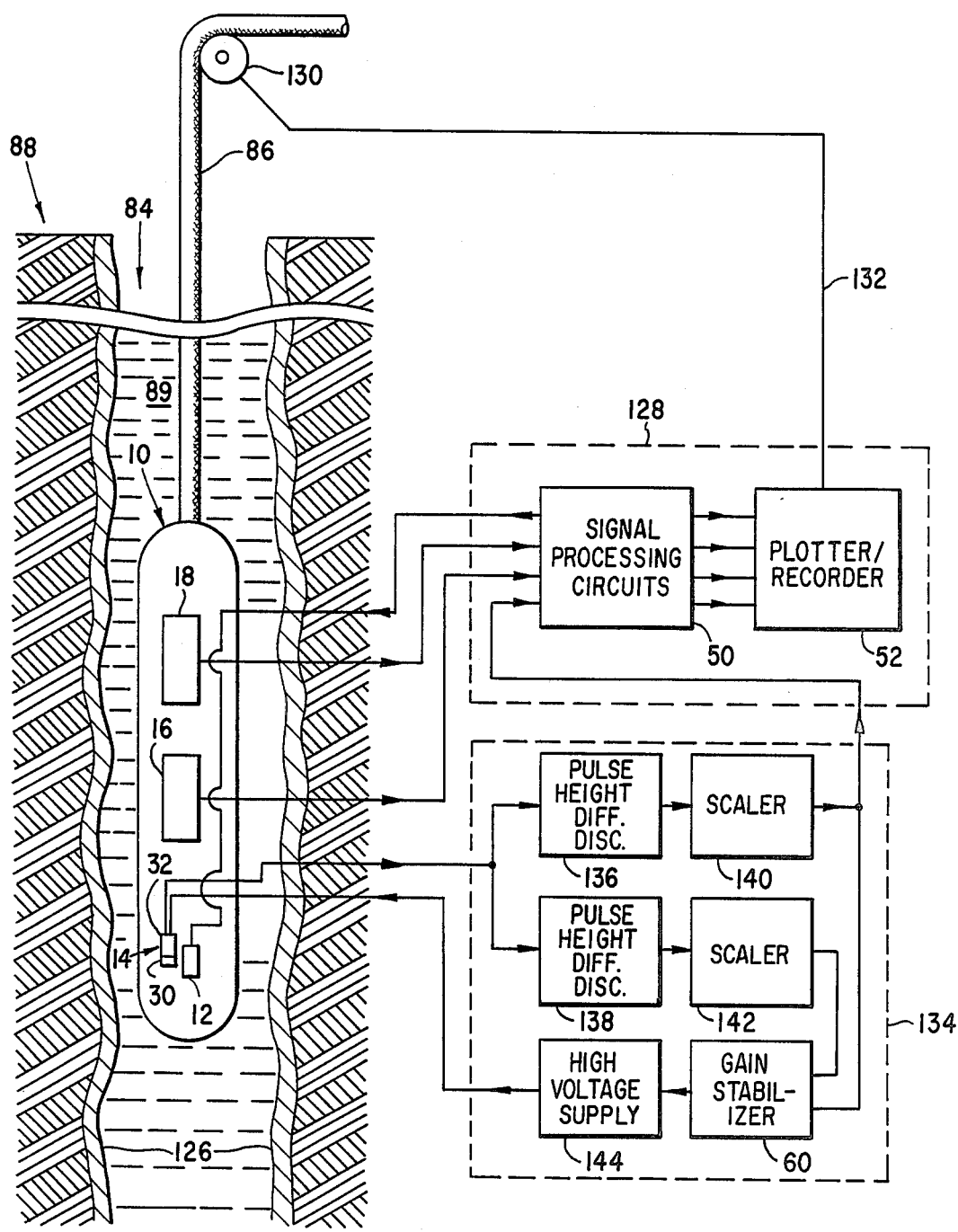
FIG. 13 is a schematic diagram of a neutron source intensity monitor in accordance with the invention being used with a system for investigating an earth formation surrounding a mud-filled borehole.

In the embodiment of FIG. 13, the neutron source intensity monitor 14 of the invention is shown in use in a more generalized borehole logging tool 10. The disposition of the tool within the borehole 84 is essentially the same as in FIG. 8, except that the sonde is not eccentered and a mudcake 126 is shown as formed on the borehole wall.

As in the embodiment of FIG. 1, the sonde 10 is depicted as containing a neutron source 12, the monitor 14, a near-spaced detector 16, and a far-spaced detector 18. The two detectors shown are intended to be illustrative of a typical detector arrangement in a sonde, and the sonde might contain only one or several such detectors. The detectors themselves may be of any suitable type. The sonde might also contain shielding, as shown in FIGS. 1 and 8 for example, for the neutron source and/or for the detectors.

The neutron source 12 could be either a chemical source or an accelerator source. In accordance with the invention, however, the neutron source intensity monitor is preferably used with an accelerator source, and is particularly advantageous in connection with high-energy monoenergetic sources of the D-T type (14 MeV neutrons) or the D-D type (2.5 MeV neutrons). For convenience, the invention is described hereinafter as being used with a 14 MeV D-T accelerator source.

The scintillator 30 of the monitor 14 is shown as being adjacent to the source 12, but it could be coaxial with the source depending upon design constraints. What is significant, however, is that the scintillator 30 be located relative to the source so that the response of the scintillator is dominated, at least during and immediately following a neutron burst in the case of pulsed operation, by high energy neutrons coming directly from the source, rather than lower energy, scattered neutrons or gamma rays. In the absence of heavy shielding between the source and the scintillator, it has been found that the scintillator 30 may be spaced as far as 30 cm from the source and still function as a detector of source neutrons.

The scintillator 30 is also shown as being in contact with the photomultiplier 32. As will be understood, however, the scintillator may be optically coupled to the photomultiplier in any suitable way, e.g., a light pipe, fiber optics, or a system of lenses and mirrors, that will conduct the flashes of light in the scintillator to the photomultiplier, and need not be physically connected thereto.

Generally, the scintillator 30 may comprise any type of hydrogen-containing scintillator, e.g., liquid, plastic, or crystal, that detects scintillations resulting from proton-recoil events. Such scintillators are generally known in the art as "organic" scintillators, and will be referred to herein in that sense. Suitable organic scintillators include, for example, NE-213 (liquid), NE-102 and NE-162 (plastic), and stilbene (crystal). Plastic scintillators have been found to be particularly advantageous. Organic scintillators have very short decay times and, consequently, the maximum counting rate can be very large, which permits them to be located relatively close to the neutron source. The close proximity of the scintillator to the source maximizes the neutron flux from the source intercepted by the scintillator, thereby affording a high signal-to-noise ratio in the detector output, and also reduces the susceptibility of the monitor to scattered-back neutrons. As will be discussed more fully below, the latter feature contributes to the inherent gain stability of the monitor. Further, organic scintillators are proportional in their response to both electrons and protons, e.g. approximately twice as great for electrons as for protons in the 5-10 MeV energy range, which allows many low energy gamma ray-induced (Compton scattering) scintillations to be distinguished from the neutron-induced (proton recoil) scintillations of interest on the basis of pulse height.

If high temperatures are anticipated during borehole logging operations, the scintillator may be located in a dewar flask or may be otherwise thermally insulated. It is an advantage of the invention, however, that such thermal insulation may be omitted by use of an appropriate high-temperature plastic scintillator.

The signals from the detectors 16 and 18 and the photomultiplier 32 are transmitted in a known manner with known equipment to a surface data processing system 128 by insulated electrical conductors, not shown, located in the armored cable 86. At the surface, following any necessary preliminary decoding, pulse shaping, amplification or the like, the signals are applied to signal processing circuits 50 that carry out the desired computations, etc., and provide outputs to a plotter-recorder 52. The number of outputs shown is exemplary, and the actual number and types of outputs provided will depend upon the number and type of detectors in the sonde and the type of information being obtained. Two examples of such signal processing circuits, in conjunction with which the source intensity monitor of the invention has application, are described in the aforementioned U.S. Pat. Nos. 4,423,323 to Ellis et al. and 4,524,274 to Scott.

While the sonde 10 is being moved through the borehole 84, an indication of the depth of the sonde in the borehole is provided by a depth determining apparatus, generally indicated by reference numeral 130, which is responsive to the movement of the cable 86 as it is let out and reeled in by a winch, not shown. The depth determining apparatus 130 is connected to the plotter-recorder 52 by a conventional cable-following mechanical linkage 132.

In FIG. 13, the box 134 depicts in more detail the components 54-60 of FIG. 5 for processing the output of the monitor 14 for purposes of monitoring source intensity. The signal pulse train from the photomultiplier 32 is supplied, after being conventionally amplified and otherwise processed (amplifier 54 in FIG. 5), to a first pulse height differential discriminator circuit 136 and, where active gain stabilization is desired as discussed below, to a second pulse height differential discrimination circuit 138. Jointly these two discriminator circuits comprise the contents of component 56 in FIG. 5. The discriminator circuits are shown in FIG. 13 as being located in the downhole electronics 134, but they could if desired be included in the surface electronics 128. Each pulse height differential discriminator circuit 136 and 138 passes signals having magnitudes, i.e., pulse heights, within a selected range and attenuates all other signals. The location of these selected ranges with respect to the pulse height spectrum of the scintillator is discussed below in conjunction with FIG. 14. The signals passed by the pulse height differential discriminator circuits 136 and 138 are supplied to first and second scaler circuits 140 and 142, respectively, that generate outputs $N_1$ and $N_2$ indicative of the numbers of neutron interactions detected by the scintillator 30 (over a time period of specified duration) within the energy ranges associated with the respective discriminator circuits. The scalers 140 and 142 comprise component 58 in FIG. 5.

As explained hereinafter, the output signal from the scaler circuit 140 is proportional to the number of 14 MeV neutrons emitted by the neutron source 12 or, in other words, to the neutron source intensity. This signal is preferably sent over the cable 86 to the surface signal processing circuits 50 and is recorded by the plotter-recorder 52 as a measurement of neutron source intensity.

The outputs from the first scaler circuit 140 and the second scaler circuit 142 are also supplied to a gain stabilizer circuit 60 (FIGS. 5 and 13). The gain stabilizer circuit forms the ratio of the output $N_1$ from scaler circuit 140 to the output $N_2$ from scaler circuit 142, i.e. $N_1/N_2$, and in conventional fashion derives a control signal for the high voltage supply 144 of the photomultiplier 32 based on a comparison of this ratio with a constant reference value. The gain stabilizer circuit then controls the high voltage supply, again in a manner known in the art, to increase or decrease photomultiplier gain, as the case may be, to maintain the ratio at the reference value.

Due to the inherent gain stability of the monitor of the invention, as described in detail below, active gain compensation is unnecessary in many applications. In such a situation, only the first pulse height differential discriminator circuit 136 and the first scaler circuit 140 are needed to monitor the neutron source intensity, and the entire active gain stabilizer circuit, including the discriminator circuit 138, the second scaler circuit 142, and the gain stabilizer circuit 60 are unnecessary and can be eliminated.

Figure 14:
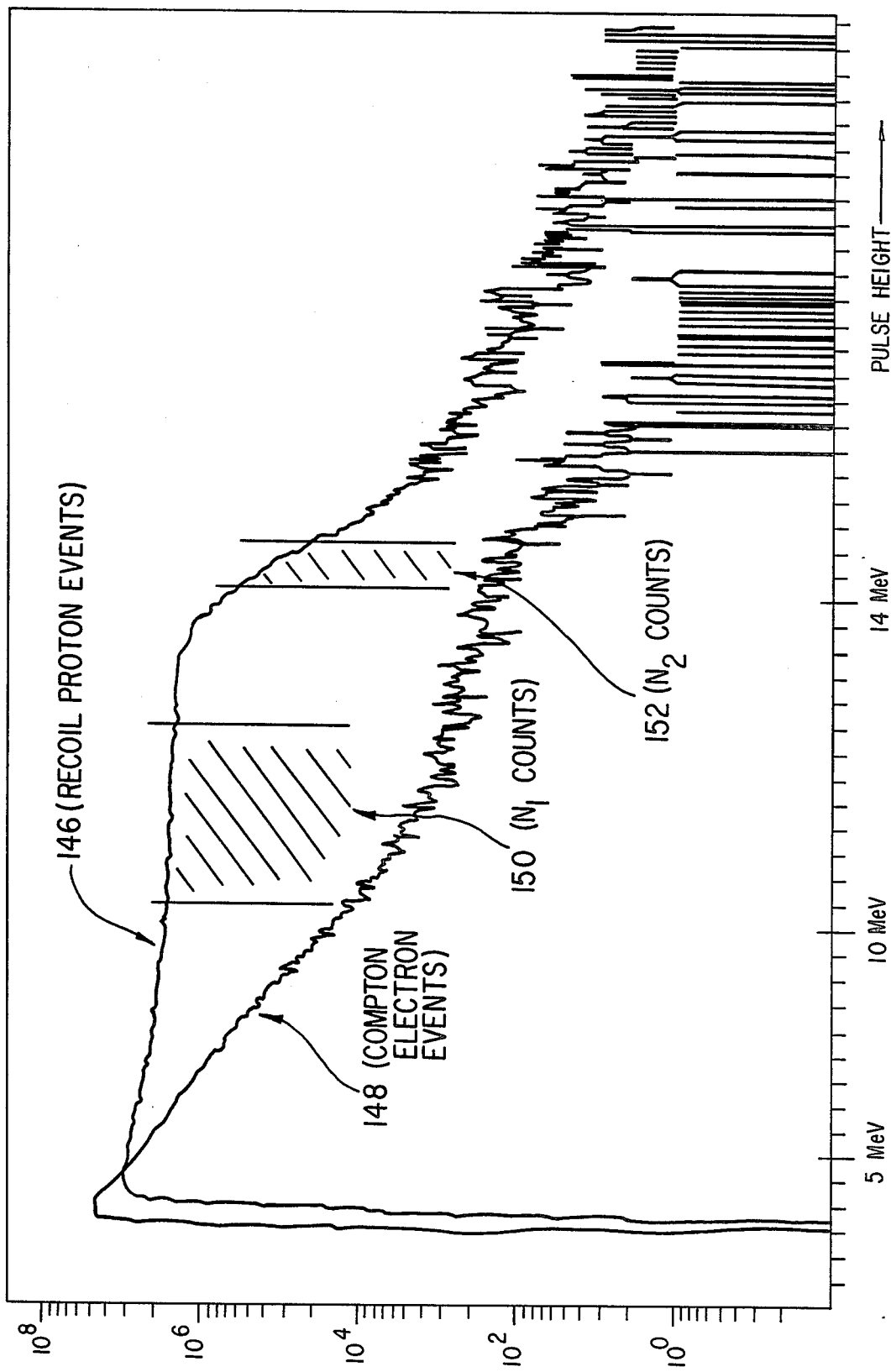
FIG. 14 is a graph showing curves of count rates for neutron-induced events and for gamma ray-induced events versus energy for a neutron source intensity monitor in accordance with the invention.
Figure 15:
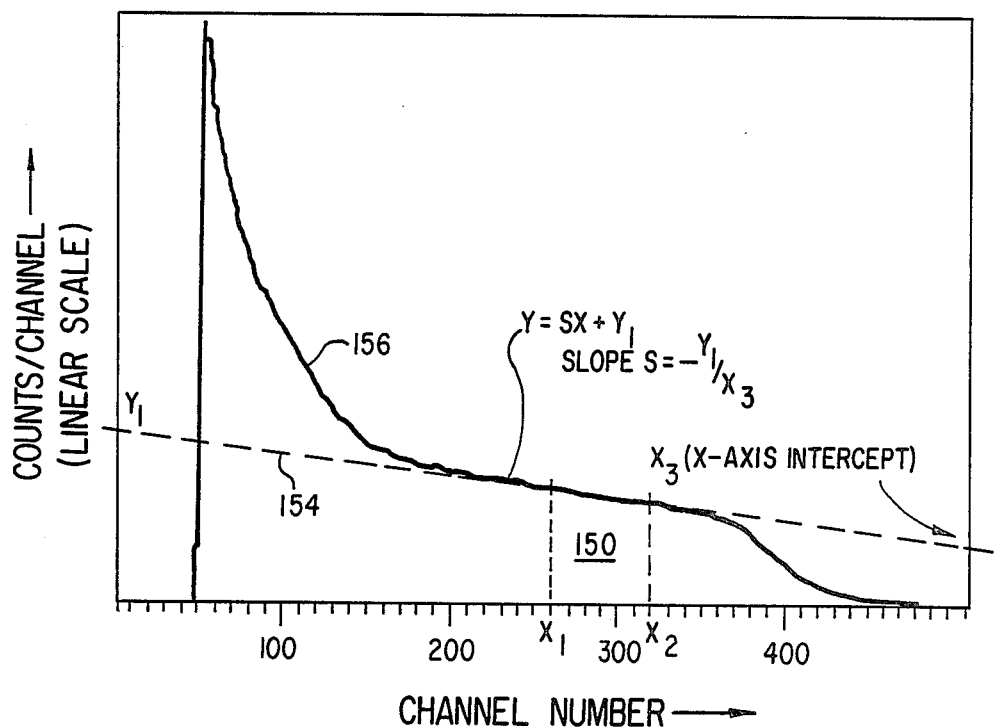
FIG. 15 is a linear plot of the pulse height spectrum (counts/channel v. channel) and shows a linear approximation to the spectrum shape in the region of the discriminator window for monitoring source strength.

In FIG. 14, count rate is plotted on the vertical axis and pulse height (recoil proton energy for curve 146 and Compton electron energy for curve 148) is plotted on the horizontal axis. The curve designated by reference numeral 146 is a curve of an observed scintillator pulse height spectrum for neutron-induced recoil proton events in a neutron-gated $\frac{3}{4}$ inch $\times\frac{3}{4}$ inch (1.9 cm $\times$ 1.9 cm) NE-213 liquid scintillator. The source was a 14 MeV D-T accelerator.

The curve designated by reference numeral 148 is a curve of an observed scintillator pulse height spectrum for gamma ray-induced Compton electron events in the same scintillator, but gated for gammas. The total scintillator pulse height spectrum is obtained by adding the curves 146 and 148. The curves 146 and 148 were obtained by placing the scintillator about 1.8 inches (4.6 cm) from the target of a D-T accelerator neutron source. A pulse shape discriminator was used in order to separate the neutron induced events from the gamma ray-induced events. As the composition of NE-213 is similar to that of plastic, the curves of FIG. 14 may be taken as representative of plastic scintillator spectra as well.

As noted, the curve 146 is essentially a pulse height spectrum for recoil protons, with the corresponding recoil proton energy shown along the horizontal axis. Because neutron-proton scattering is basically isotropic in the center-of-mass system at the energies involved in FIG. 14, the undistorted recoil proton pulse height spectrum is rectangular in shape. However, the observed pulse height spectrum is nonrectangular due to the influence of several factors, including multiple neutron scattering, escape of recoil protons from the scintillator volume, nonlinear light response of the scintillator-photomultiplier, and the resolution function of the equipment. The curve 146 has essentially two portions: a first portion that remains substantially flat or decreases slightly at higher energies, i.e., energies from the discriminator threshold level at about 3-4 MeV up to 12-13 MeV, as energy increases, and a second portion that decreases rather rapidly at still higher energies, i.e., energies above 13-14 MeV, as energy increases.

As is apparent from FIG. 14, the neutron-induced spectrum 146 is much higher, usually by at least two orders of magnitude, than the gamma ray-induced spectrum 148. Therefore, the total scintillator pulse height spectrum, which is obtained by adding these curves, has essentially the same shape as the curve 146 in the region of interest: 10 MeV or greater recoil proton energy.

Reference numeral 150 designates the range, i.e., the pulse height interval or window, of the signals that are passed by the first pulse height differential discriminator circuit 136, and reference numeral 152 designates the range of signals that are passed by the second pulse height differential discriminator circuit 138. The pulse height interval 150 is selected so that it is in the higher-energy section of the flat portion of the curve 146, where the effects of 14-MeV neutrons dominate and where, as is dicussed in more detail below, the effects of lower-energy, scattered neutrons and gamma rays are insignificant. The window 150 should be wide enough to provide sufficiently high counting rates for satisfactory statistical precision.

As illustrated in FIG. 14, the pulse height window 150 is preferably chosen so that signals due to recoil proton energies greater than about 10 MeV are passed. In this region, the effects of lower-energy, scattered neutrons and gamma rays do not appreciably affect the counting rate due to 14-MeV neutrons when the total scintillator pulse height spectrum is measured, which of course is what is measured by the monitor during normal operations. Lower-energy, scattered neutrons do not appreciably affect the counting rate because the scintillator 30 is located sufficiently close to the source so that most of the neutrons reaching the scintillator are source neutrons, i.e., directly incident thereon from the source and not back-scattered, and because the discriminator 136 blocks pulses due to lower-energy, scattered neutrons. Similarly, gamma rays do not appreciably affect the counting rate during the period of recoil neutron production because the discriminator 136 blocks pulses due to lower-energy gamma rays and because the small scintillator size substantially eliminates the effects of higherenergy gamma rays. Thus, the window 150 effectively passes signals induced substantially only by higher-energy, source neutrons. Consequently, the signal passed by the window 150, and counted by the scaler circuit 140, is proportional to and primarily representative of the 14-MeV neutron source intensity.

In addition to placing the energy window 150 high enough in the pulse height spectrum to eliminate low-energy recoil protons and gamma rays, as described above, the following procedure is preferably followed in setting the window 150. First, the pulse height spectrum is accumulated. Second, with reference to FIG. 15, the limits $X_1$ and $X_2$ of the energy window 150 are preferably set so as to substantially satisfy the following relationship:

$$\frac{\Delta N}{N \Delta g} = 1 + \frac{1}{1 - X_3/X_{avg}} = 0$$

where:

N is the total number of counts in the window 152;
Δg is the change from g=1 in gain g of the spectrum;
ΔN is the change in N with Δg;
$X_3$ is the X-axis intercept of the linear approximation 154 to the shape of the spectrum 156 in the region of the window 150; and
$X_{avg}$ is $(X_1 + X_2)/2$.

Third, $X_1$ and $X_2$ should stay in the linear region of the spectrum 156. If necessary or desirable, the scintillator size may be modified to give the desired spectrum shape.

Inasmuch as the effects of both higher-energy and lower-energy gamma rays are substantially eliminated in a neutron source intensity monitor in accordance with the invention, a pulse shape discriminator, which is complex and comparatively slow, is unnecessary.

The pulse height interval 152 for the second pulse height differential discriminator circuit 138 is preferably selected so that it is at or higher than the knee of the curve 146, where the curve decreases markedly as enery increases. With the window 152 selected thusly, if the monitor system gain changes, the curve 146 will shift significantly and the counting rate in the window 152 will change accordingly. If the high voltage increases, the curve will shift to the right, and the counting rate in the window will increase. If the high voltage decreases, the curve will shift to the left, and the counting rate in the window will decrease. Consequently, the counting rate $N_2$ in the window 152 is sensitive to fluctuations in gain and may be used, preferably in conjunction with the counting rate $N_1$ as described above, for gain control.

As indicated previously, active gain stabilization will be unnecessary in many applications, in which case the second pulse height differential discriminator circuit 138, the second scaler circuit 142, and the gain stabilizer circuit 60 can be eliminated. Active gain stabilization will be unnecessary, for instance, where the inherent gain stability of the monitor system, e.g., first order gain changes, i.e., 10-20%, cause only second order changes, i.e., 1-2%, in the measured source intensity, affords acceptable precision.

In order to achieve this inherent stability, the scintillator must be sized, on the one hand, to minimize gamma ray-induced (Compton scattering) events and, on the other hand, to maximize recoil proton-induced events in the energy range of interest. In the case of a 14 MeV D-T accelerator, where the pulse height window 150 is set at 10 MeV and above, the scintillator size should therefore be selected to minimize the number of Compton electron events within the scintillator which would produce light pulse magnitudes comparable to those produced by 10 MeV and above recoil protons. Electron energy loss in a scintillator is approximately 2 MeV/g/cm$^2$. A typical plastic scintillator might have a density of approximately 1 g/cm$^3$, so that, in a plastic scintillator, the electron energy loss would be about 2 MeV/cm. At the energies of interest here, however, the light output produced in the scintillator by an electron energy loss event is approximately twice that produced by a recoil proton energy loss event. Hence, a 5 MeV electron would result in approximately the same scintillator output as a 10 MeV proton.

Accordingly, for an energy window 150 beginning at 10 MeV, the number of 5 MeV and above electron energy loss events in the scintillator must be kept small. And as electron energy loss is approximately 2 MeV/cm in a plastic scintillator, the upper limit for the size of the scintillator in any dimension, referred to herein as the "characteristic dimension," is approximately 2.5 cm or about 1 inch, for a volumetric upper limit of approximately 16 cm$^3$ or 1 in$^3$. A suitable characteristic dimension for the organic scintillators mentioned herein, when used to detect 14 MeV source neutrons, has been found to be on the order of ½" (1.3 cm) or ¾" (1.9cm). This choice of scintillator size is consistent both with providing for inherent gain stabilization and with providing for sufficiently high count rates for good statistical precision.

If lower energy windows are used, which would be the case for a 2.5 MeV D-D accelerator, for example, the scintillator must be smaller because many more lower energy electrons would lose all of their energies in a 1 inch (2.5 cm) crystal. Moreover, the relationship of light output per energy loss is less favorable at lower energies, so that electron events at a given energy appear as recoil proton (neutron-induced) events at more than twice the electron energy.

With the scintillator appropriately sized, higher-energy gamma ray-induced signals will be substantially eliminated since the Compton electrons produced in the scintillator will escape from the scintillator and not produce signals, whereas recoil protons produced in the scintillator by the source neutrons will produce signals that are picked up by the photomultiplier. The resulting scintillator pulse height spectrum will be similar to the curve 146 in FIG. 14. Also, the scintillator should be located with respect to the neutron source so that most of the neutrons reaching the scintillator come directly from the neutron source and are not lower-energy, scattered neutrons. If these conditions obtain (scintillator size and placement relative to the source) and if the pulse height window 150 is chosen as indicated above, i.e., so that the effects of lower-energy, scattered neutrons and lower-energy gamma rays are insignificant, a simple neutron source intensity monitor that has inherent gain stability results.

Although the neutron source monitor of the invention has been described herein in connection with a borehole logging tool, it will be understood that it can be used as well in other applications where high energy neutrons sources are utilized.

Although the invention has been described herein with respect to specific embodiments thereof, it will be understood that various modifications and variations may be made thereto without departing from the inventive concepts disclosed. All such modifications and variations, therefore, are intended to be included within the spirit and scope of the appended claims.

We claim:

1. A well logging tool for investigating an earth formation surrounding a borehole comprising:
   an accelerator neutron source;
   neutron source monitoring means responsive primarily, during operation of said neutron source, to unmoderated neutrons incident thereon directly from said neutron source for monitoring the output thereof, the sensitive volume of said monitoring means being located externally of but closely adjacent to the neutron source;

first neutron detection means for detecting epithermal neutrons, said first neutron detection means including a sensitive volume spaced from said accelerator neutron source and being substantially insensitive to neutrons below approximately 0.5 eV in energy, the sensitive volume of said first neutron detection means being located close to said neutron source without substantial intervening high density shielding;

first shielding means, having both neutron moderating and neutron absorbing properties, for shielding the sensitive volume of said first neutron detection means so as to increase the low energy neutron detection threshold of said first neutron detection means to at least approximately 10 eV;

second neutron detection means for detecting epithermal neutrons, said second neutron detection means including a sensitive volume located farther from said accelerator neutron source than the sensitive volume of said first neutron detection means and eccentered towards one side of the well logging tool, said second neutron detection means being substantially insensitive to neutrons below approximately 0.5 eV in energy; and second shielding means, having both neutron moderating and neutron absorbing properties, for shielding the sensitive volume of said second neutron detection means from neutrons incident thereon from a side thereof away from said one side of the well logging tool.

2. The well logging tool of claim 1 wherein said first shielding means has a substantially annular shape and is located around the sensitive volume of said first neutron detection means.

3. The well logging tool of claim 1 wherein said first shielding means comprises an hydrogenous material that moderates neutrons having a neutron absorbing material dispersed therein.

4. The well logging tool of claim 3 wherein the neutron absorbing material is boron carbide.

5. The well logging tool of claim 1 wherein said second shielding means has a substantially cylindrical shape with a slot therein facing said one side of the well logging tool, the sensitive volume of said second neutron detection means being located in said slot.

6. The well logging tool of claim 1 wherein said second shielding means comprises an hydrogenous material that moderates neutrons having a neutron absorbing material dispersed therein.

7. The well logging tool of claim 6 wherein the neutron absorbing material is boron carbide.

8. The well logging tool of claim 1 additionally comprising:

third shielding means located between said first neutron detection means and said second neutron detection means.

9. The well logging tool of claim 8 wherein said third shielding means comprises an hydrogenous material that moderates neutrons having a neutron absorbing material dispersed therein.

10. The well logging tool of claim 9 wherein the neutron absorbing material is boron carbide.

11. The well logging tool of claim 1 wherein said accelerator neutron source is a substantially monoenergetic D-T source of 14-MeV neutrons.

12. The well logging tool of claim 1 wherein said neutron source monitoring means includes an organic scintillator and a photomultiplier, said scintillator and said photomultiplier being optically coupled.

13. The well logging tool of claim 12 wherein said scintillator is a plastic scintillator.

14. The well logging tool of claim 12 wherein said scintillator is located on the radius of the neutron accelerator at the position of the target.

15. The well logging tool of claim 12 wherein said neutron source monitoring means further comprises:

means coupled to said photomultiplier for measuring, as a function of time during periods when said neutron source is not operating, the intensity of capture gamma rays in the formation surrounding the tool; and means for processing said intensity measurements to derive a measurement of the thermal neutron capture cross section of the earth formation.

16. The well logging tool of claim 15 wherein said capture gamma ray intensity measuring comprises means for measuring at least substantially the entire intensity vs. time decay curve during said periods when said neutron source is not operating.

17. The well logging tool of claim 1 wherein said first and second neutron detection means each comprises an He-3 proportional counter covered by a thin cadmium layer.

18. The well logging tool of claim 1 additionally comprising means for deriving a signal indicative of the ratio of the output signal of said first neutron detection means to the output signal of said second neutron detection means as an indication of formation porosity.

19. The well logging tool of claim 1 additionally comprising:

means for deriving a first ratio signal indicative of the ratio of the output signal of said neutron source monitoring means to the output signal of said first neutron detection means; and means for deriving a second ratio signal indicative of the ratio of the output signal of said neutron source monitoring means to the output signal of said second neutron detection means.

20. The well logging tool of claim 19 additionally comprising:

means for combining said first and second ratio signals to derive a signal indicative of the porosity of the formation.

21. The well logging tool of claim 1 additionally comprising:

third neutron detection means for detecting thermal neutrons, said third neutron detection means including a sensitive volume located farther from said accelerator neutron source than the sensitive volume of said second neutron detection means and being shielded on the side thereof away from said one side of the well logging tool by a neutron absorbing material.

22. The well logging tool of claim 21 wherein said third neutron detection means is shielded on the side thereof away from said one side of the well logging tool by a thin cadmium shield.

23. The well logging tool of claim 21 wherein said third neutron detection means comprises an He-3 proportional counter.

24. The well logging tool of claim 21 wherein said third neutron detection means is eccentered towards said one side of the well logging tool.

25. The well logging tool of claim 21 additionally comprising:
means for deriving a first ratio signal indicative of the ratio of the output signal of said neutron source monitoring means to the output signal of said third neutron detection means; and
means for deriving a second ratio signal indicative of the ratio of the output signal of said neutron source monitoring means to the output signal of said second neutron detection means.

26. The well logging tool of claim 25 additionally comprising means for combining said first and second ratio signals to derive a signal indicative of the macroscopic capture cross section of the formation.

27. The well logging tool of claim 1 additionally comprising means for urging said one side of the well logging tool towards the borehole wall, such that the sensitive volume of said second neutron detection means will be adjacent the formation and said second shielding means will shield said sensitive volume from neutrons incident thereon from the borehole.

28. The well logging tool of claim 1 further comprising means defining an array of neutron detectors, located between the sensitive volumes of said first and second neutron detector means, for detecting the neutron flux in the formation surrounding the borehole at at least two different axially-spaced points from said neutron source.

29. The well logging tool of claim 28 wherein:
said detector array means for detecting the neutron flux at said at least two points comprises two detectors of substantially the same neutron energy sensitivity, and
said detector array defining means further comprises a third neutron detector of a neutron sensitivity substantially different from that of said two detectors.

30. The well logging tool of claim 29 wherein said two detectors are sensitive to one of thermal neutron energies and epithermal neutron energies and said third detector is sensitive to the other of said energies.

31. The well logging tool of claim 28 wherein the sensitive volumes of said two detectors are (1) eccentered towards one side of the tool and (2) axially-spaced from one another lengthwise of the tool, and the sensitive volume of said third detector is (1) located at substantially the same distance from the neutron source as the more closely spaced of said two detector sensitive volumes and (2) transversely spaced from said more closely spaced sensitive volume.

32. A well logging tool for investigating an earth formation surrounding a borehole comprising:
a substantially monoenergetic D-T accelerator source of 14-MeV neutrons;
neutron source monitoring means responsive primarily to unmoderated neutrons incident thereon directly from said neutron source for monitoring the output thereof, the sensitive volume of said monitoring means being located externally of but closely adacent to the neutron source;
a first He-3 proportional counter spaced from but close to said neutron source, without subtantial intervening high density shielding, and being substantially insensitive to neutrons below approximately 0.5 eV in energy;
first shielding means, having both neutron moderating and neutron absorbing properties, for shielding said first He-3 proportional counter so as to increase the low energy neutron detection threshold of said first He-3 proportional counter to at least approximately 10 eV;
a second He-3 proportional counter located farther from said neutron source than said first He-3 proportional counter, said second He-3 proportional counter being eccentered towards one side of the well logging tool and being substantially insensitive to neutrons below approximately 0.5 eV in energy;
second shielding means, having both neutron moderating and neutron absorbing properties, for shielding said second He-3 proportional counter from neutrons incident thereon from a side thereof away from said one side of the well logging tool; and
a third He-3 proportional counter located farther from said neutron source than said second He-3 proportional counter and being eccentered towards said one side of the well logging tool and shielded on the side thereof away from said one side of the well logging tool by a neutron absorbing material.

33. The well logging tool of claim 32 wherein said first shielding means has a substantially annular shape and is located around said first He-3 proportional counter.

34. The well logging tool of claim 33 wherein said second shielding means has a substantially cylindrical shape with a slot therein facing said one side of the well logging tool, said second He-3 proportional counter being located in said slot.

35. The well logging tool of claim 34 wherein said first and second shielding means each comprises an hydrogenous material that moderates neutrons having a neutron absorbing material dispersed therein.

36. The well logging tool of claim 35 wherein the neutron absorbing material is boron carbide.

37. The well logging tool of claim 32 wherein said neutron source monitoring means comprises an organic scintillator, comprising said sensitive volume, and a photomultiplier optically coupled thereto, said organic scintillator being located substantially at the radius of said accelerator neutron source at the position of the target.

38. The well logging tool of claim 32 additionally comprising means for deriving a signal indicative of the ratio of the output signal of said first He-3 proportional counter to the output signal of said second He-3 proportional counter as an indication of formation porosity.

39. The well logging tool of claim 32 additionally comprising:
means for deriving a first ratio signal indicative of the ratio of the output signal of said neutron source monitoring means to the output signal of said first He-3 proportional counter; and
means for deriving a second ratio signal indicative of the ratio of the output signal of said neutron source monitoring means to the output signal of said second He-3 proportional counter.

40. The well logging tool of claim 39 additionally comprising means for combining said first and second ratio signals to derive a signal indicative of the porosity of the formation.

41. The well logging tool of claim 32 additionally comprising:
means for deriving a first ratio signal indicative of the ratio of the output signal of said neutron source monitoring means to the output signal of said third He-3 proportional counter; and means for deriving a second ratio signal indicative of the ratio of the output signal of said neutron source monitoring means to the output signal of said second He-3 proportional counter.

42. The well logging tool of claim 41 additionally comprising means for combining said first and second ratio signals to derive a signal indicative of the macroscopic capture cross section of the formation.

43. The well logging tool of claim 32 additionally comprising means for urging said one side of the well logging tool towards the borehole wall, such that said second and said third He-3 proportional counters will be adjacent the formation and shielded from neutrons from the borehole.

44. Apparatus for investigating a characteristic of an earth formation traversed by a borehole, comprising:

a source of high energy neutrons for irradiating said earth formation so as to give rise to a population of neutrons within the borehole including (1) a first flux of relatively low energy neutrons carrying information about said formation as a result of scattering reactions with formation constituents, (2) a second flux of neutrons carrying information predominately about the borehole contents as a result of scattering reactions with said borehole contents, and (3) a third flux of relatively high energy neutrons carrying information predominately about neutrons emanating directly from said neutron source;

first and second neutron detectors spaced at near and far distances, respectively, from said neutron source for detecting said neutron population and for generating first and second signals, respectively, representative thereof;

neutron shielding means for altering the energy characteristics of the neutron flux reaching said first detector so that said first signal is predominately indicative of said third flux and relatively less indicative of said first and second fluxes; and means for combining said first and second signals to provide an indication of said characteristic of said formation.

45. The apparatus of claim 44 wherein said first and second detectors comprise He-3 gas-filled detectors.

46. The apparatus of claim 44 wherein said neutron shielding means is comprised of:

a material for moderating high energy neutrons incident thereon to energy levels at which they are more readily detected by said first detector means and for moderating intermediate energy neutrons to low energies; and a material for absorbing low energy neutrons.

47. The apparatus of claim 46 wherein said moderating material and said absorbing material are substantially uniformly distributed in a member surrounding the sensitive volume of said first detector.

48. The apparatus of claim 47 wherein said moderating material comprises an hydrogeneous material and said absorbing material comprises boron carbide distributed in said hydrogeneous material.

49. The apparatus of claim 44 further comprising a cladding of material on at least said first detector for absorbing neutrons of less than epithermal energies, said cladding being located inside of said neutron shielding means.

50. The apparatus of claim 49 wherein said cladding is provided on both detectors.

51. The apparatus of claim 44 wherein:

said first detector comprises a generally cylindrical sensitive volume; and said neutron shielding means comprises an annulus surrounding at least the outer cylindrical surface of said sensitive volume.

52. The apparatus of claim 51 wherein said annulus comprises a substantially uniform mixture of said moderating material and said absorbing material.

53. The apparatus of claim 51 wherein said annulus comprises an inner annular layer composed of said absorbing material and an outer annular layer composed of said moderating material.

54. The apparatus of claim 51 wherein:

said annulus comprises a plurality of transverse sections; and axially alternate sections are composed of said moderating material and said absorbing material, respectively.

55. The apparatus of claim 51 wherein:

said annulus comprises a plurality of circumferential sections; and circumferentially alternate sections are composed of said moderating material and said absorbing material, respectively.

56. The apparatus of claim 44 wherein said characteristic is porosity.

57. Well logging apparatus for investigating a characteristic of an earth formation traversed by a borehole, comprising:

a well tool adapted to be moved through a borehole;

a neutron accelerator carried by said well tool for irradiating an earth formation with high energy neutrons so as to give rise to a population of neutrons within the borehole including (1) a first flux of relatively low energy neutrons carrying information about said formation as a result of scattering reactions with formation constituents, (2) a second flux of relatively intermediate energy neutrons carrying information predominately about the borehole contents as a result of scattering reactions with said borehole contents, and (3) a third flux of relatively high energy neutrons carrying information predominately about neutrons emanating substantially directly from said neutron source;

first and second He-3 gas-filled neutron detectors carried by said well tool at near and far distances, respectively, from said accelerator for detecting said neutron population and for generating first and second signals, respectively, representative thereof;

neutron shielding means located within said well tool in surrounding relation to the sensitive volume of said first detector for (1) moderating high energy neutrons to levels more readily detected by said first detector and intermediate level neutrons to low energy levels and (2) absorbing low energy neutrons, so as to modify the energy characteristics of the neutron flux reaching said first detector so that said first signal is predominately indicative of said third flux and relatively less indicative of said first and second fluxes; and means for combining said first and second signals to provide an indication of said characteristic of the formation.

58. The apparatus of claim 57 wherein said neutron accelerator is of the D,T-reaction type producing 14 Mev neutrons.

59. The apparatus of claim 58 wherein said characteristic is porosity.

60. The apparatus of claim 57 wherein the sensitive volume of each of said first and second detectors is clad with a layer of low energy, neutron-absorbing material for absorbing neutrons of less than epithermal energies.

61. The apparatus of claim 60 wherein each said sensitive volume is clad with cadmium.

62. The apparatus of claim 57 wherein said neutron absorbing means is composed of boron carbide and said neutron moderating means is composed of an hydrogeneous material.

63. The apparatus of claim 62 wherein said neutron absorbing means comprises an annulus composed of a substantially uniform mixture of boron carbide distributed in an epoxy resin binder.

64. A neutron dector system for selectively monitoring the output of a high energy neutron source in a borehole logging too, comprising:
a neutron detector for detecting neutrons emitted by said neutron source and for generating a signal representative thereof, said detector normally being comparatively sensitive to low energy neutrons and comparatively insensitive to high energy neutrons; and
neutron shielding means surrounding said detector for raising the lower energy detection threshold of said detector to at least as high as approximately 10 ev, said shielding means being effective (1) to moderate high energy neutrons incident thereon to intermediate energy levels within the sensitive range of said detector and to moderate intermediate energy neutrons incident thereon to comparative low energy levels and (2) to absorb comparatively low energy neutrons incident thereon or moderated therein, such that said detector output signal is predominately indicative of high energy neutorns emanating substantially directly from said neutorn source, as distinct from intermediate energy and low energy neutrons scattered back to the detector from the borehole environment or earth formations surrounding the borehole.

65. The detector system of claim 64 wherein said neutron shielding means comprises a member encircling the sensitive volume of said detector, said member being composed of a substantially uniformly distributed mixture of neutron moderating material and neutron absorbing material.

66. The detector system of claim 65 wherein said moderating material comprises an hydrogeneous material and said absorbing material comprises boron carbide distributed in said hydrogeneous material.

67. The detector system of claim 64 further comprising a cladding of material on said detector for absorbing low-energy neutrons, said cladding being located inside of said neutron shielding means.

68. The detector system of claim 64 wherein said detector comprises a He-3 gas-filled detector.

69. The detector system of claim 64 wherein:
said detector comprises a generally cylindrical sensitive volume; and
said neutron shielding means comprises an annulus surrounding at least the outer cylindrical surface of said sensitive volume.

70. The detector system of claim 69 wherein said annulus comprises a substantially uniform mixture of neutron moderating material and neutron absorbing material.

71. The detector system of claim 69 wherein said annulus comprises an inner annular layer composed of neutron absorbing material and an outer annular layer composed of neutron moderating material.

72. The detector system of claim 69 wherein:
said annulus comprises a plurality of transverse sections; and
axially alternate sections are composed of neutron moderating material and neutron absorbing material, respectively.

73. The detector system of claim 69 wherein:
said annulus comprises a plurality of circumferential sections; and
circumferentially alternate sections are composed of neutron moderating material and neutron absorbing material, respectively.

74. A neutron source monitor for monitoring the output of a high-energy neutron source, comprising:
an organic scintillator for detecting high-energy neutrons incident thereon substantially directly from the neutron source and for producing outputs related to the incident energies thereof, said scintillator having a characteristic detector dimension that is large relative to the average range of recoil protons produced in said scintillator by substantially source-strength neutrons and small relative to the average range of those Compton-scattering electrons produced in said scintillator which would appear to the scintillator to have energies within the energy range of said recoil protons;
a photomultiplier optically coupled to said scintillator and responsive to the outputs thereof for producing signals representative of the energies of the recoil protons produced by detected neutrons;
first pulse height discriminator means coupled to said photomultiplier for passing photomultiplier output signals having magnitudes corresponding to a range of the pulse height spectrum located on the flat region of the scintillator spectrum and sufficiently high thereon comparatively to eliminate scintillator outputs produced by scattered-back neutrons and by gamma rays; and
means for counting the signals passed by said first pulse height discriminator means as an indication of neutron source intensity.

75. The neutron source monitor of claim 74 wherein:
said neutron source is a substantially monoenergetic D-T source of 14 MeV neutrons, and
the range of signals passed by said first pulse height discriminator corresponds to a range of the pulse height spectrum located above about 10 MeV.

76. The neutron source monitor of claim 75 wherein said characteristic dimension is such that the scintillator volume is on the order of 1 inch$^3$ (16.4 cm$^3$) or less.

77. The neutron source monitor of claim 76 wherein the limits of the range of signals passed by said first pulse height discriminator means are selected such that the relationship $\Delta N/N\Delta g = 0$ is substantially satisifed; where N is the number of counts within said range, $\Delta g$ is the change in gain of the pulse height spectrum, and $\Delta N$ is the change in N with $\Delta g$.

78. The neutron source monitor of claim 74 wherein said scintillator comprises a plastic organic scintillator.

79. The neutron source monitor of claim 74 further comprising:
  second pulse height discriminator means coupled to said photomultiplier for passing photomultiplier output signals having magnitudes corresponding to a range of the pulse height spectrum located on a comparatively rapidly varying region of the spectrum above said flat region thereof;
  means for counting the signals passed by said second pulse height discriminator means; and
  gain stabilizer means coupled to said first and second counting means for taking a ratio of the counting rates from said respective spectrum ranges and for deriving a gain-compensation signal so as to maintain said ratio at a substantially constant value.

80. The neutron source monitor of claim 79 wherein the range of signals passed by said second pulse height discriminator means corresponds to a range of the pulse height spectrum located in the region of the knee of the spectrum.

81. The neutron source monitor of claim 80 wherein said gain-compensation signal is applied to the high voltage power supply for said photomultiplier.

82. In a well logging tool including a high-energy neutron source and means for monitoring the intensity of the source, the improvement in said source monitoring means comprising:
  an organic scintillator for detecting high-energy neutrons incident thereon substantially directly from the neutron source and for producing outputs related to the incident energies thereof, said scintillator having a characteristic detector dimension of a size that is large relative to the average range of recoil protons produced in said scintillator by substantially source-strength neutrons and small relative to the average range of those Compton-scattering electrons produced in said scintillator which would appear to the scintillator to have energies within the energy range of said recoil protons;
  said scintillator being located with respect to the neutron source so as substantially to reduce the incidence thereon of scattered-back neutrons relative to the incidence thereon of neutrons emanating directly from the source;
  a photomultiplier optically coupled to said scintillator and responsive to the outputs thereof for producing signals representative of the energies of the recoil protons produced by detected neutrons;
  first pulse height discriminator means coupled to said photomultiplier for passing photomultiplier output signals having magnitudes corresponding to a range of the scintillator pulse height spectrum located on the flat region of the spectrum and sufficiently high therein comparatively to eliminate scintillator outputs produced by scattered-back neutrons and by gamma rays; and
  means for counting the signals passed by said first pulse height discriminator means as an indication of neutron source intensity.

83. The well logging tool of claim 82 wherein:
  said neutron source is a substantially monoenergetic D-T source of 14 MeV neutrons, and
  the range of signals passed by said first pulse height discriminator corresponds to a range of the pulse height spectrum located above about 10 MeV.

84. The well logging tool of claim 83 wherein said characteristic dimension is such that the scintillator volume is on the order of 1 inch$^3$ (16.4 cm$^3$) or less.

85. The well logging tool of claim 83 wherein said scintillator is located on the order of thirty cm or less from the target of the neutron source.

86. The well logging tool of claim 84 wherein the limits of the range of signals passed by said first pulse height discriminator means are selected such that the relationship $\Delta N/N\Delta g = 0$ is substantially satisifed; where N is the number of counts within said range, $\Delta g$ is the change in gain of the pulse height spectrum, and $\Delta N$ is the change in N with $\Delta g$.

87. The well logging tool of claim 82 wherein said scintillator comprises a plastic organic scintillator.

88. The well logging tool of claim 82 further comprising:
  second pulse height discriminator means coupled to said photomultiplier for passing photomultiplier output signals having magnitudes corresponding to a range of the pulse height spectrum located on a comparatively rapidly varying region of the spectrum above said flat region thereof;
  means for counting the signals passed by said second pulse height discriminator means; and
  gain stabilizer means coupled to said first and second counting means for taking a ratio of the counting rates from said respective spectrum ranges and for deriving a gain-compensation signal so as to maintain said ratio at a substantially constant value.

89. The well logging tool of claim 88 wherein the range of signals passed by said second pulse height discriminator means corresponds to a range of the pulse height spectrum located in the region of the knee of the spectrum.

90. The well logging tool of claim 89 wherein said gain-compensation signal is applied to the high voltage power supply for said photomultiplier.

91. The well logging tool of claim 88 wherein:
  said neutron source is a substantially monoenergetic D-T source of 14 MeV neutrons;
  the range of signals passed by said first pulse height discriminator corresponds to a range of the pulse height spectrum located above about 10 MeV;
  said scintillator comprises a plastic organic scintillator; and
  said characteristic dimension is such that the scintillator volume is on the order of 1 inch$^3$ (16.4 cm$^3$) or less.

92. The well logging tool of claim 82 wherein said improvement further comprises means coupled to said photomultiplier for measuring as a function of time, during periods when said neutron source is not operating, the response of said scintillator to the decay of the capture gamma ray intensity in a formation surrounding the tool.

93. The well logging tool of claim 92 wherein said decay measuring means comprises means for measuring at least substantially the entire intensity vs. time decay curve during said periods when said neutron source is not operating.

94. The well logging tool of claim 93 wherein said decay measuring means comprises:
  third pulse height discriminator means coupled to said photomultiplier for passing all photomultiplier output signals having magnitudes greater than a relatively low equivalent gamma ray energy threshold; and
  means for sorting the signals passed by said third pulse height discriminator means into time bins to measure said intensity vs. time decay curve.

* * * * *

UNITED STATES PATENT AND TRADEMARK OFFICE
CERTIFICATE OF CORRECTION

PATENT NO. : 4,760,252

DATED : July 26, 1988

INVENTOR(S) : Paul Albats and Stephen Antkiw

It is certified that error appears in the above-identified patent and that said Letters Patent is hereby corrected as shown below:

First page, Item [63], second line and third/fourth lines, delete "which is a continuation-in-part of" (both instances);
Col. 2, line 34, "D,T" should read --D-T--;
Col. 2, line 44, "Mev" should read --MeV--;
Col. 3, line 32, delete "Jacobs";
Col. 4, line 64, "D,T-type" should read --D-T-type--;
Col. 7, line 66, "need" should read --needed--;
Col. 10, line 52, "abosorber" should read --absorber--;
Col. 10, line 57, "th" should read --the--;
Col. 14, line 41, "deection" should read --detection--;
Col. 20, line 29, "dicussed" should read --discussed--;
Col. 25, line 62, "subtantial" should read --substantial--;
Col. 29, line 2, "D,T-reaction" should read --D-T-reaction--;
Col. 29, line 20, "dector" should read --detector--;
Col. 29, line 42, "neutorns" should read --neutrons--;
Col. 29, line 43, "neutorn" should read --neutron--;
Col. 30, line 63, "satisifed" should read --satisfied--;
Col. 32, line 7, "satisifed" should read --satisfied--.

Signed and Sealed this

Tenth Day of January, 1989

Attest:

DONALD J. QUIGG

Attesting Officer

Commissioner of Patents and Trademarks